US012690002B2

(12) United States Patent  
Shreevastav et al.

(10) Patent No.: US 12,690,002 B2  
(45) Date of Patent: Jul. 21, 2026

(54) WIRELESS DEVICE POSITIONING CAPABILITY IN A WIRELESS COMMUNICATION NETWORK

(71) Applicant: Telefonaktiebolaget LM Ericsson (publ), Stockholm (SE)

(72) Inventors: Ritesh Shreevastav, Upplands Väsby (SE); Åke Busin, Sollentuna (SE); Yazid Lyazidi, Hässelby (SE); Sara Modarres Razavi, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 577 days.

(21) Appl. No.: 18/031,375

(22) PCT Filed: Oct. 12, 2021

(86) PCT No.: PCT/SE2021/050994

§ 371 (c)(1),  
(2) Date: Apr. 12, 2023

(87) PCT Pub. No.: WO2022/081068

PCT Pub. Date: Apr. 21, 2022

(65) Prior Publication Data

US 2023/0388958 A1 Nov. 30, 2023

Related U.S. Application Data

(60) Provisional application No. 63/090,580, filed on Oct. 12, 2020.

(51) Int. Cl.  
*H04W 64/00* (2009.01)

(52) U.S. Cl.  
CPC .................................. *H04W 64/00* (2013.01)

(58) Field of Classification Search  
None  
See application file for complete search history.

(56) References Cited

U.S. PATENT DOCUMENTS

| | | | |
|---|---|---|---|
| 2012/0040687 A1* | 2/2012 | Siomina | ................ H04W 24/00 |
| | | | 455/422.1 |
| 2014/0106774 A1 | 4/2014 | Siomina et al. | |

(Continued)

FOREIGN PATENT DOCUMENTS

| | | |
|---|---|---|
| CN | 102438311 A | 5/2012 |
| CN | 110913473 A | 3/2020 |

(Continued)

OTHER PUBLICATIONS

Ericsson, "LPP signalling for integrity support of RAT dependent positioning", 3GPP TSG RAN WG2 #111-e, R2-2006957, Aug. 17-28, 2020.

(Continued)

*Primary Examiner* — Suhail Khan  
(74) *Attorney, Agent, or Firm* — Murphy, Bilak & Homiller, PLLC

(57) ABSTRACT

A network node (16) is configured for use in a wireless communication network (10). The network node (16) receives one or more positioning capabilities (18) of a wireless device (12), and stores the one or more positioning capabilities (18) in storage (24) that is at or accessible to the network node (16). After storing the one or more positioning capabilities (18) of the wireless device (12), the network node (16) receives a positioning request (28) for the wireless device (12). Responsive to receiving the positioning request (28), the network node (16) retrieves the one or more positioning capabilities (18) of the wireless device (12) from the storage (24), and sends, to a positioning server (20) in the wireless communication network (10), a message that comprises the positioning request (28) and that includes the one (Continued)

or more positioning capabilities (18) retrieved from the storage (24). The wireless device operates thus proactively, by rendering available the wireless device positioning capability at the network node before the positioning request is received and allowing the network node to reply in a reduced time.

18 Claims, 24 Drawing Sheets

(56)                    References Cited

U.S. PATENT DOCUMENTS

| | | | |
|---|---|---|---|
| 2019/0037338 A1* | 1/2019 | Edge | .................. H04W 4/02 |
| 2020/0045666 A1 | 2/2020 | Edge et al. | |

FOREIGN PATENT DOCUMENTS

| | | |
|---|---|---|
| EP | 2679061 B1 | 12/2019 |
| JP | 2004158947 A | 6/2004 |
| JP | 2020522167 A | 7/2020 |

OTHER PUBLICATIONS

3GPP, "3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 16)", 3GPP TS 36.305 V16.2.0, Sep. 2020, 1-92.

3GPP, "3rd Generation Partnership Project; Technical Specification Group Radio Access Network; LTE Positioning Protocol (LPP) (Release 16)", 3GPP TS 37.355 V16.2.0, Sep. 2020, 1-296.

3GPP, "3rd Generation Partnership Project; Technical Specification Group Radio Access Network; NG Radio Access Network (NG-RAN); Stage 2 functional specification of User Equipment (UE) positioning in NG-RAN (Release 16)", 3GPP TS 38.305 V16.2.0, Sep. 2020, 1-117.

3GPP, "3rd Generation Partnership Project; Technical Specification Group Radio Access Network; NG-RAN; NR Positioning Protocol A (NRPPa) (Release 16)", 3GPP TS 38.455 V16.1.0, Sep. 2020, 1-147.

3GPP, "3rd Generation Partnership Project; Technical Specification Group Services and System Aspects; 5G System (5GS) Location Services (LCS); Stage 2 (Release 16)", 3GPP TS 23.273 V16.4.0, Jul. 2020, 1-96.

3GPP, "3rd Generation Partnership Project; Technical Specification Group Services and System Aspects; Procedures for the 5G System (5GS); Stage 2 (Release 16)", 3GPP TS 23.502 V16.6.0 (Sep. 2020), Sep. 2020, 1-597.

Qualcomm Incorporated, "NR Positioning Enhancements", 3GPP TSG RAN Meeting #86, RP-193237, Sitges, Spain, Dec. 9-12, 2019, 1-19.

* cited by examiner

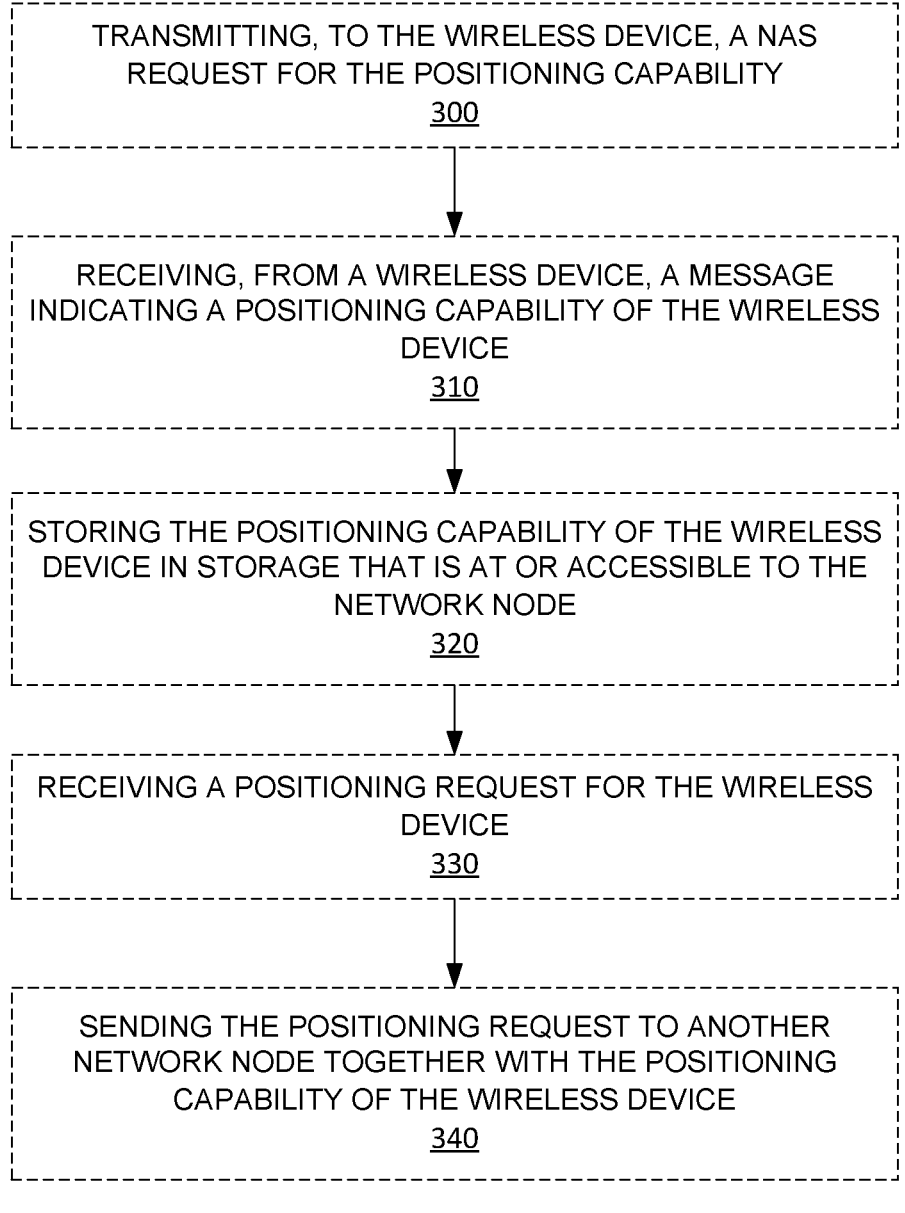

TRANSMITTING, TO THE WIRELESS DEVICE, A NAS
REQUEST FOR THE POSITIONING CAPABILITY
300

RECEIVING, FROM A WIRELESS DEVICE, A MESSAGE
INDICATING A POSITIONING CAPABILITY OF THE WIRELESS
DEVICE
310

STORING THE POSITIONING CAPABILITY OF THE WIRELESS
DEVICE IN STORAGE THAT IS AT OR ACCESSIBLE TO THE
NETWORK NODE
320

RECEIVING A POSITIONING REQUEST FOR THE WIRELESS
DEVICE
330

SENDING THE POSITIONING REQUEST TO ANOTHER
NETWORK NODE TOGETHER WITH THE POSITIONING
CAPABILITY OF THE WIRELESS DEVICE
340

FIGURE 3

RECEIVING, FROM ANOTHER NETWORK NODE, A
POSITIONING REQUEST FOR A WIRELESS DEVICE
TOGETHER WITH A POSITIONING CAPABILITY OF THE
WIRELESS DEVICE
400

PREPARING POSITIONING ASSISTANCE INFORMATION FOR
THE WIRELESS DEVICE BASED ON THE POSITIONING
CAPABILITY OF THE WIRELESS DEVICE
410

SENDING THE POSITIONING ASSISTANCE INFORMATION TO
THE WIRELESS DEVICE
420

*FIGURE 8*

RECEIVES POSITIONING CAPABILITY OF THE UE AT THE
TIME OF TAU REGISTRATION
1000

STORES THE POSITIONING CAPABILITY IN THE AMF OR
UNIFIED DATA MANAGEMENT (UDM)
1010

RECEIVES POSITIONING REQUEST FOR THE TARGET UE
1020

SENDS THE POSITIONING REQUEST TO NETWORK NODE 2
(E.G., LMF) TOGETHER WITH TARGET DEVICE POSITIONING
CAPABILITIES
1030

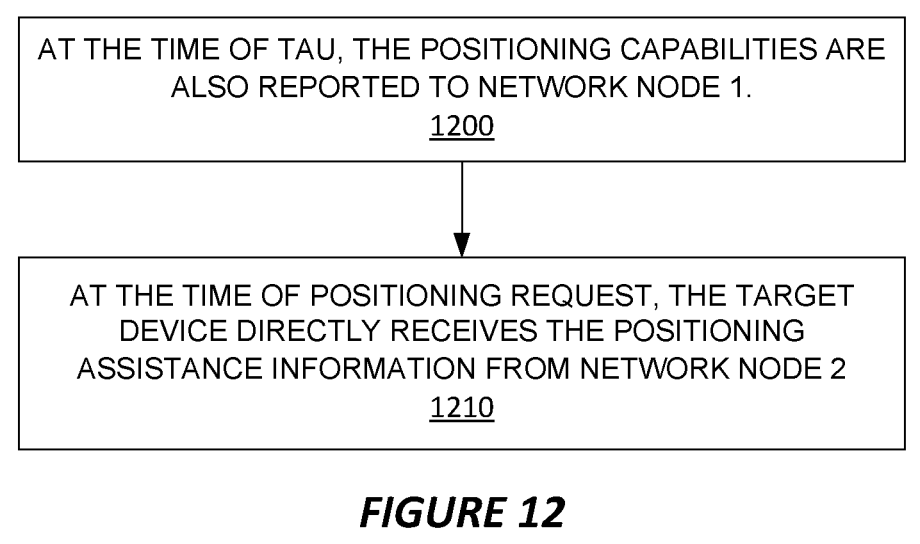

AT THE TIME OF TAU, THE POSITIONING CAPABILITIES ARE ALSO REPORTED TO NETWORK NODE 1.
1200

AT THE TIME OF POSITIONING REQUEST, THE TARGET DEVICE DIRECTLY RECEIVES THE POSITIONING ASSISTANCE INFORMATION FROM NETWORK NODE 2
1210

*FIGURE 12*

WIRELESS DEVICE POSITIONING CAPABILITY IN A WIRELESS COMMUNICATION NETWORK

TECHNICAL FIELD

The present application relates generally to a wireless communication network, and relates more particularly to wireless device positioning capability in such a network.

BACKGROUND

In a wireless communication network, a positioning server may provide information to a wireless device to assist with the positioning of that wireless device. This so-called assistance information may be prepared based on a positioning capability of the wireless device, e.g., a capability indicating positioning method(s) supported by the wireless device. The wireless device heretofore transmits its positioning capability to the positioning server using a positioning protocol, such as the Long Term Evolution (LTE) positioning protocol (LPP) or the New Radio (NR) positioning protocol (NRPP). With messages of the positioning protocol being transparently relayed between the wireless device and the positioning server via the radio access network (RAN) and one or more core network nodes (such as the Access and Mobility Function, AMF), transferring the positioning capability using the positioning protocol may introduce undesired latency to positioning.

SUMMARY

According to some embodiments herein, a wireless device transmits to a network node a message that indicates a positioning capability of the wireless device. The network node may be a node other than a positioning server, e.g., the network node may be or implement an AMF. In some embodiments, the message is a non-access stratum (NAS) message, e.g., that includes a positioning capability field indicating the positioning capability. That is, the message is transferred via a protocol other than a positioning protocol. Alternatively or additionally, the message may be a message of a procedure for attaching the wireless device to or registering the wireless device with the wireless communication network. In these and other embodiments, the message and/or the positioning capability may be targeted to and/or destined for the network node, e.g., separate from and apart from any targeting of the positioning capability for the positioning server. Indeed, rather than the message being transmitted to the network node (e.g., at a NAS level) as part of sending the positioning capability to a positioning server via a positioning protocol (e.g., LPP), the wireless device transmits the positioning capability to the network node precisely in order to equip the network node with that positioning capability. Some embodiments do so proactively, in advance of any positioning request, such as upon device attachment or registration with the network, so that the positioning capability will be available at the network node if and when any positioning request is received. In fact, in some embodiments, the network node stores the positioning capability of the wireless device upon receipt, e.g., in anticipation of receiving a positioning request at some point. In these and other embodiments, then, the network node may retrieve the positioning capability upon receiving a positioning request and then transmit the positioning request together with the positioning capability to another network node, e.g., a positioning server. Some embodiments may thereby advantageously reduce latency in the positioning process, by reducing the latency that would otherwise be attributable to retrieving the positioning capability from the wireless device via a positioning protocol.

More particularly, embodiments herein include a method performed by a network node configured for use in a wireless communication network. The method comprises receiving one or more positioning capabilities of a wireless device, and storing the one or more positioning capabilities in storage that is at or accessible to the network node. The method further comprises, after storing the one or more positioning capabilities of the wireless device, receiving a positioning request for the wireless device. The method also comprises, responsive to receiving the positioning request, retrieving the one or more positioning capabilities of the wireless device from the storage, and sending, to a positioning server in the wireless communication network, a message that comprises the positioning request and that includes the one or more positioning capabilities retrieved from the storage.

In some embodiments, receiving the one or more positioning capabilities comprises fetching the one or more positioning capabilities from the positioning server.

In some embodiments, the one or more positioning capabilities indicate at least one of any one or more of one or more positioning methods supported by the wireless device, capabilities of the wireless device to support an update of periodic assistance data, a positioning reference signal processing capability of the wireless device, a positioning reference signal resource capability of the wireless device, and a capability related to a positioning protocol supported between the wireless device and a positioning server in the wireless communication network.

In some embodiments, the positioning server implements a location management function, LMF.

In some embodiments, the network node is or implements an Access and Mobility Function, AMF.

In some embodiments, each of the one or more positioning capabilities is categorized by the message as either a radio access technology, RAT, dependent positioning capability, or a RAT-independent positioning capability.

Other embodiments herein include a method performed by a positioning server configured for use in a wireless communication network. The method comprises receiving, from a network node in the wireless communication network, a message that comprises a positioning request for a wireless device and that includes one or more positioning capabilities of the wireless device.

In some embodiments, the method further comprises preparing positioning assistance information for the wireless device based on the one or more positioning capabilities of the wireless device, and sending the positioning assistance information to the wireless device.

In some embodiments, the method further comprises, based on the one or more positioning capabilities being included in the message, refraining from requesting the one or more positioning capabilities from the wireless device.

In some embodiments, the positioning server is or implements a location management function, LMF.

In some embodiments, the network node is or implements an Access and Mobility Function, AMF.

In some embodiments, the one or more positioning capabilities indicate at least one of any one or more of one or more positioning methods supported by the wireless device, capabilities of the wireless device to support an update of periodic assistance data, a positioning reference signal processing capability of the wireless device, a positioning reference signal resource capability of the wireless device, and a capability related to a positioning protocol supported between the wireless device and a positioning server in the wireless communication network.

In some embodiments, each of the one or more positioning capabilities is categorized by the message as either a radio access technology, RAT, dependent positioning capability, or a RAT-independent positioning capability.

Other embodiments herein include a network node configured for use in a wireless communication network. The network node is configured to receive one or more positioning capabilities of a wireless device, store the one or more positioning capabilities in storage that is at or accessible to the network node, and after storing the one or more positioning capabilities of the wireless device, receive a positioning request for the wireless device. The network node is further configured to, responsive to receiving the positioning request, retrieve the one or more positioning capabilities of the wireless device from the storage, and send, to a positioning server in the wireless communication network, a message that comprises the positioning request and that includes the one or more positioning capabilities retrieved from the storage.

In some embodiments, the network node is configured to perform the steps described above for a network node.

Other embodiments herein include a positioning server configured for use in a wireless communication network. The positioning server is configured to receive, from a network node in the wireless communication network, a message that comprises a positioning request for a wireless device and that includes one or more positioning capabilities of the wireless device.

In some embodiments, the positioning server is configured to perform the steps described above for a positioning server.

Other embodiments herein include a computer program comprising instructions which, when executed by at least one processor of a network node, causes the network node to perform the steps described above for a network node. Other embodiments herein include a computer program comprising instructions which, when executed by at least one processor of a positioning server, causes the positioning server to perform the steps described above for a positioning server. In one or more of these embodiments, a carrier containing the computer program is one of an electronic signal, optical signal, radio signal, or computer readable storage medium.

Other embodiments herein include a computer network node configured for use in a wireless communication network. The network node comprises communication circuitry and processing circuitry. The processing circuitry is configured to receive one or more positioning capabilities of a wireless device, store the one or more positioning capabilities in storage that is at or accessible to the network node, and after storing the one or more positioning capabilities of the wireless device, receive a positioning request for the wireless device. The processing circuitry is also configured to, responsive to receiving the positioning request, retrieve the one or more positioning capabilities of the wireless device from the storage, and send, to a positioning server in the wireless communication network, a message that comprises the positioning request and that includes the one or more positioning capabilities retrieved from the storage.

In some embodiments, the processing circuitry is configured to perform the steps described above for a network node.

Other embodiments herein include a positioning server configured for use in a wireless communication network. The positioning server comprises communication circuitry and processing circuitry. The processing circuitry is configured to receive, from a network node in the wireless communication network, a message that comprises a positioning request for a wireless device and that includes one or more positioning capabilities of the wireless device.

In some embodiments, the processing circuitry is configured to perform the steps described above for a positioning server.

Other embodiments herein include a method performed by a wireless device configured for use in a wireless communication network. The method comprises determining, based on a timer at the wireless device, a time when the wireless device is to provide one or more positioning capabilities of the wireless device to the wireless communication network unsolicited, and providing the one or more positioning capabilities of the wireless device to the wireless communication network unsolicited at the determined time.

In some embodiments, determining a time comprises determining to provide one or more positioning capabilities of the wireless device to the wireless communication network unsolicited when the timer expires.

In some embodiments, determining a time comprises determining to refrain from providing one or more positioning capabilities of the wireless device to the wireless communication network unsolicited while the timer is running.

In some embodiments, the method further comprises receiving, from the wireless communication network, signaling that sets a value of the timer.

Other embodiments herein include a wireless device configured for use in a wireless communication network. The wireless device is configured to determine, based on a timer at the wireless device, a time when the wireless device is to provide one or more positioning capabilities of the wireless device to the wireless communication network unsolicited, and provide the one or more positioning capabilities of the wireless device to the wireless communication network unsolicited at the determined time.

In some embodiments, the wireless device is configured to perform the steps described above for a wireless device.

Other embodiments herein include a computer program comprising instructions which, when executed by at least one processor of a wireless device, causes the wireless device to perform the steps described above for a wireless device.

In some embodiments, a carrier containing the computer program is one of an electronic signal, optical signal, radio signal, or computer readable storage medium.

Other embodiments herein include a wireless device configured for use in a wireless communication network. The wireless device comprises communication circuitry and processing circuitry. The processing circuitry is configured to determine, based on a timer at the wireless device, a time when the wireless device is to provide one or more positioning capabilities of the wireless device to the wireless communication network unsolicited, and provide the one or more positioning capabilities of the wireless device to the wireless communication network unsolicited at the determined time.

In some embodiments, the processing circuitry is configured to perform the steps described above for a wireless device.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 3 is a logic flow diagram of a method performed by a network node according to some embodiments.

FIG. 8 is a block diagram of the positioning architecture in New Radio (NR) according to some embodiments.

FIG. 12 is a logic flow diagram of a method performed by a target device (e.g., UE) according to some embodiments.

DETAILED DESCRIPTION

Figure 1:
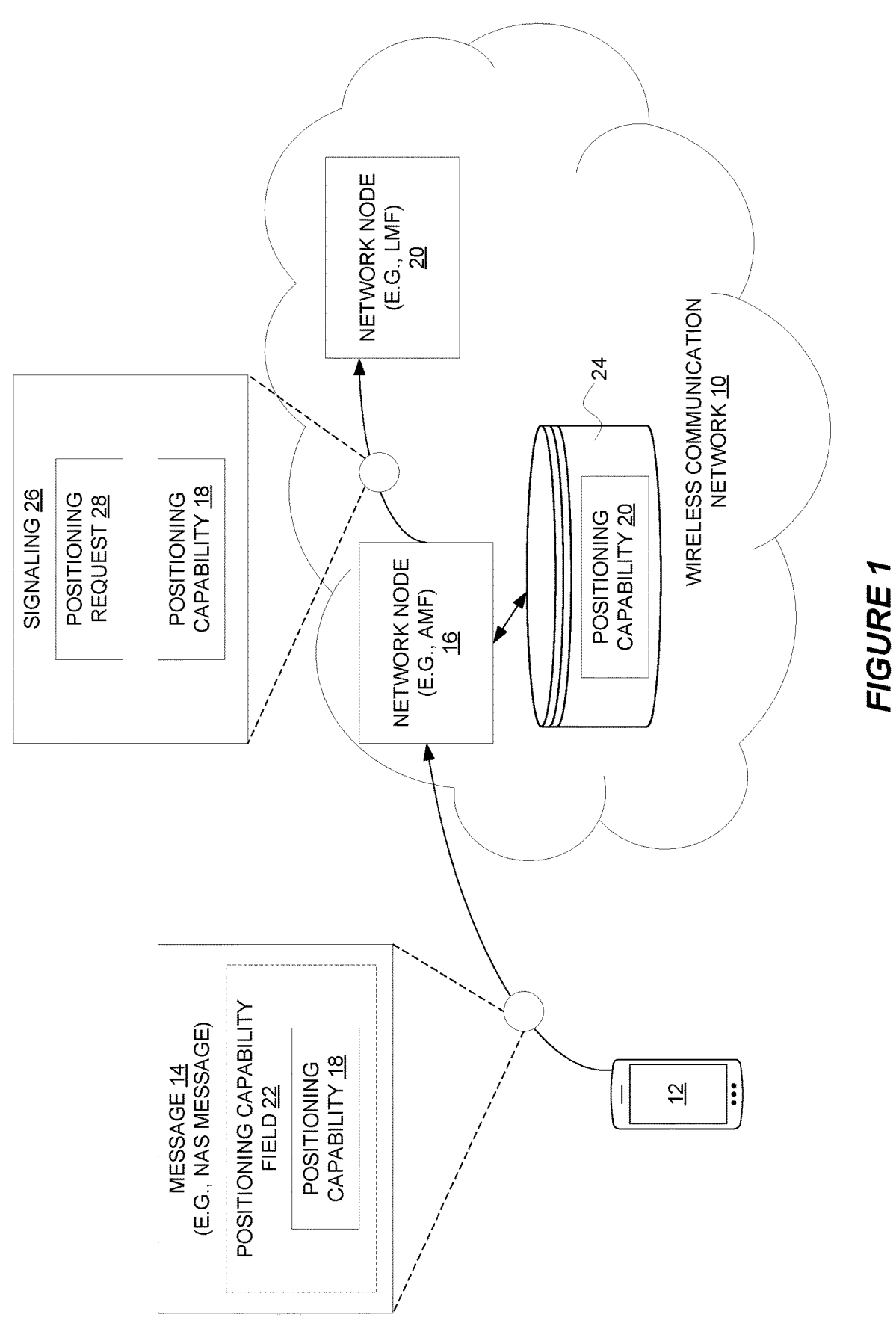
FIG. 1 is a block diagram of a wireless communication network according to some embodiments.

FIG. 1 shows a wireless communication network 10 (e.g., a 5G network) according to some embodiments. A wireless device 12 as shown is configured to transmit a message 14 to a network node 16 in the wireless communication network 10, e.g., a core network (CN) node such as an Access and Mobility Function (AMF). The message 14 indicates a positioning capability 18 of the wireless device 12.

The positioning capability 18 may comprise one or more capabilities applicable to or relevant to positioning, e.g., of the wireless device 12. For example, the positioning capability 18 may indicate one or more positioning methods supported by the wireless device, capabilities of the wireless device to support an update of periodic assistance data, a positioning reference signal processing capability of the wireless device, and/or a positioning reference signal resource capability of the wireless device. Alternatively or additionally, the positioning capability 18 may indicate a capability related to a positioning protocol (e.g., LPP or NRPP) supported between the wireless device 12 and a positioning server or positioning functionality in the wireless communication network 10. FIG. 1 for instance shows a network node 20, e.g., that is or implements a location management function (LMF), where the wireless device 12 and the network node 20 communicate via the positioning protocol.

In these and other embodiments, the wireless device 12 may transmit the message 14 to the network node 16 for the purpose of providing the positioning capability 18 to the network node 16 itself, i.e., the network node 16 itself is the target or destination of the positioning capability 18. For example, in some embodiments, the message 14 is a non-access stratum (NAS) message. In one or more such embodiments, the NAS message may be a message other than a NAS Transport message and/or may not convey a positioning protocol message. For instance, rather than encapsulating a positioning protocol message within the message 14 and transmitting the message 14 to the network node 16 so that the network node 16 can relay the positioning protocol message to network node 20, the wireless device 12 according to some embodiments transmits the message 14 to the network node 16 separate and apart from any positioning protocol procedure. Alternatively or additionally, the message 14 may be transmitted to the network node 16 in a way that is non-transparent to the network node 16, i.e., the network node 16 processes and retrieves the positioning capability 18 from the message 14, as opposed to just transparently forwarding the message 14 and/or the positioning capability 18 on to the network node 20. In some embodiments, for example, the message 14 includes a positioning capability field 22 that indicates the positioning capability 18. In this case, the network node 16 may process the message 14 in order to retrieve the positioning capability 18 from the positioning capability field 22. In fact, in some embodiments, the network node 16 transmits to the wireless device 12 a request (e.g., a NAS request message) for the positioning capability 18.

Alternatively or additionally, the message 14 may be a message of a procedure for attaching the wireless device 12 to or registering the wireless device 12 with the wireless communication network 10. The message 14 may for example be an attach request message that requests attachment of the wireless device 12 to the wireless communication network 10. Or, the message 14 may be an area update request message that requests an update to registration of a tracking area of the wireless device 12 or a registration area of the wireless device 12.

In these and other embodiments, the wireless device 12 may transmit the message 12 with the positioning capability 18 proactively, in advance of any positioning request, so that the positioning capability 18 will be available at the network node 16 if and when any positioning request is received. In fact, in some embodiments, the network node 16 stores the positioning capability 18 of the wireless device 12 upon receipt, e.g., in anticipation of receiving a positioning request at some point. FIG. 1 for example shows the network node 16 as storing the positioning capability 18 in storage 24 that is at or is accessible to the network node 16. The storage 24 in some embodiments for instance is or is provided by Unified Data Management (UDM). Regardless of the nature of storage 24, though, the network node 16 may retrieve the positioning capability 18 from storage 24 upon receiving a positioning request and then transmit the positioning request together with the positioning capability 18 to network node 20. FIG. 1 in this regard shows that the network node 16 transmits to network node 20 signaling that includes both a positioning request 28 and positioning capability 18, e.g., within the same message. The network node 16 in these and other embodiments may in turn proactively provide the network node 20 with the positioning capability 18, without the network node 20 having to request such capability. Some embodiments may thereby advantageously reduce latency in the positioning process, by reducing the latency that would otherwise be attributable to retrieving the positioning capability 18 from the wireless device 12 via a positioning protocol.

Generally, then, according to embodiments herein, the network node 16 obtains the positioning capability 18 of the wireless device 12 and stores that positioning capability 18, so that the network node 16 can later on proactively provide the stored positioning capability 18 to another network node 20 with a positioning request 28. In some embodiments, the network node 16 obtains the positioning capability 18 from the wireless device 12, e.g., in a message of a procedure for attaching the wireless device 12 to or registering the wireless device 12 with the wireless communication network 10. In other embodiments, though, the network node 16 obtains the positioning capability 18 from the other network 20. For example, the network node 16 may obtain the positioning capability 18 from the other network node 20 and store that positioning capability 18. Then, later on when the network node 16 receives a positioning request 28, the network node 16 may proactively proactively provide the stored positioning capability 18 to the other network node 20 with the positioning request 28.

Figure 2:
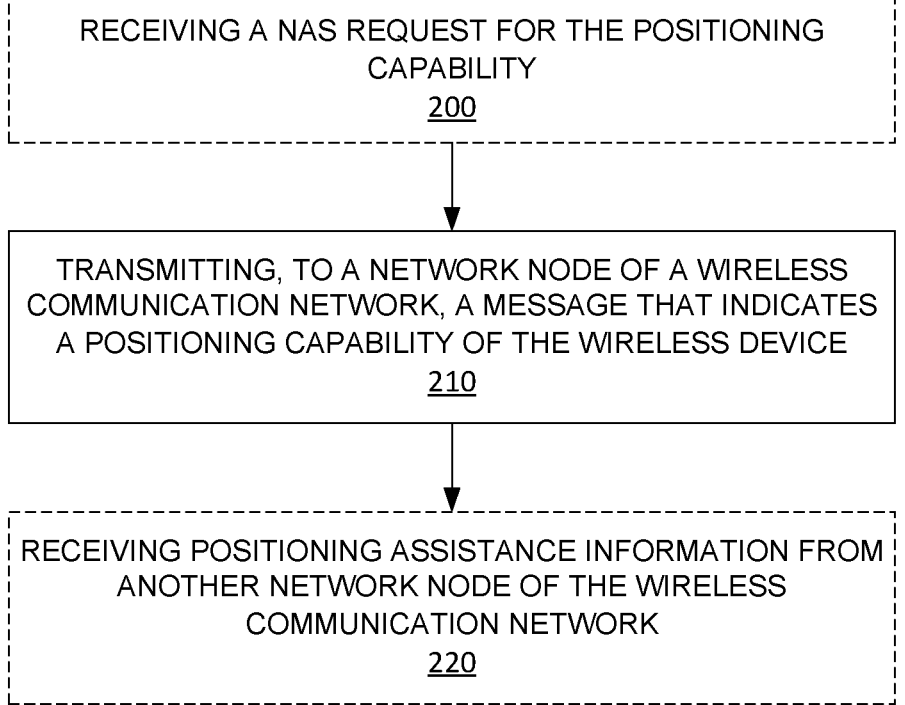
FIG. 2 is a logic flow diagram of a method performed by a wireless device according to some embodiments.

In view of the modifications and variations herein, FIG. 2 depicts a method performed by a wireless device 12 in accordance with particular embodiments. The method includes transmitting, to a network node 16 of a wireless communication network 10, a message 14 that indicates a positioning capability 18 of the wireless device 12 (Block 210).

The positioning capability may for example indicate (i) one or more positioning methods supported by the wireless device 12, (ii) capabilities of the wireless device 12 to support an update of periodic assistance data, (iii) a positioning reference signal processing capability of the wireless device 12, and/or (iv) a positioning reference signal resource capability of the wireless device 12. Alternatively or additionally, the positioning capability may be a radio access technology, RAT, dependent positioning capability or a RAT-independent positioning capability. Alternatively or additionally, the positioning capability may comprise a capability related to a positioning protocol supported between the wireless device and a positioning server in the wireless communication network Regardless, in some embodiments, the message 14 is a message of a procedure for attaching the wireless device 12 to or registering the wireless device 12 with the wireless communication network 10. In these and other embodiments, the message 14 may be an attach request message that requests attachment of the wireless device 12 to the wireless communication network 10. In other embodiments, the message 14 may be an area update request message that requests an update to registration of a tracking area of the wireless device 12 or a registration area of the wireless device 12. In still other embodiments, the message may be a request for one or more positioning ciphering keys.

In some embodiments, the network node to which the message is transmitted is or implements an Access and Mobility Function, AMF. The AMF in this case may, for example, be interconnected to multiple Location Management Functions, LMFs.

In these and other embodiments, the message may be a non-access stratum, NAS, message. In one such embodiment, the message may include a positioning capability field that indicates the positioning capability of the wireless device. Alternatively or additionally, the message is transmitted to the network node responsive to receiving a NAS request for the positioning capability (Block 200). In this case, for instance, the NAS request may be received responsive to transmitting a mobile originated location request to the network node.

In other embodiments, the message is a mobile originated location request included in an uplink NAS transport message. In one such embodiment, the positioning capability is embedded in the message as a positioning protocol message.

In any event, in some embodiments, the method further comprises receiving positioning assistance information from another network node of the wireless communication network (Block 220). For example, the another network node may be or implement a Location Management Function, LMF. Alternatively or additionally, the positioning assistance information may be received with, or contemporaneously with, a positioning request.

FIG. 3 depicts a method performed by a network node 16 configured for use in a wireless communication network 10 in accordance with other particular embodiments. In some embodiments, the method includes receiving, from a wireless device 12, a message 14 indicating a positioning capability 18 of the wireless device 12 (Block 310).

The positioning capability may for example indicate (i) one or more positioning methods supported by the wireless device 12, (ii) capabilities of the wireless device 12 to support an update of periodic assistance data, (iii) a positioning reference signal processing capability of the wireless device 12, and/or (iv) a positioning reference signal resource capability of the wireless device 12. Alternatively or additionally, the positioning capability may be a radio access technology, RAT, dependent positioning capability or a RAT-independent positioning capability. Alternatively or additionally, the positioning capability may comprise a capability related to a positioning protocol supported between the wireless device and a positioning server in the wireless communication network Regardless, in some embodiments, the message 14 is a message of a procedure for attaching the wireless device 12 to or registering the wireless device 12 with the wireless communication network 10. In these and other embodiments, the message 14 may be an attach request message that requests attachment of the wireless device 12 to the wireless communication network 10. In other embodiments, the message 14 may be an area update request message that requests an update to registration of a tracking area of the wireless device 12 or a registration area of the wireless device 12. In still other embodiments, the message may be a request for one or more positioning ciphering keys.

In some embodiments, the network node is or implements an Access and Mobility Function, AMF. The AMF in this case may, for example, be interconnected to multiple Location Management Functions, LMFs.

In these and other embodiments, the message may be a non-access stratum, NAS, message. In one such embodiment, the message may include a positioning capability field that indicates the positioning capability of the wireless device. Alternatively or additionally, the method may further comprise transmitting, to the wireless device 12, a NAS request for the positioning capability 18 (Block 300). In this case, the positioning capability 18 may be received in response to the NAS request. In one embodiment, the NAS request may be transmitted responsive to receiving a mobile originated location request from the wireless device.

In other embodiments, the message is a mobile originated location request included in an uplink NAS transport message. In one such embodiment, the positioning capability is embedded in the message as a positioning protocol message.

By contrast, although not shown, the method may alternatively comprise receiving the positioning capability 18 from another network node 20, e.g., a positioning server.

No matter how the network node 16 obtains the positioning capability 18 of the wireless device 12, though, in some embodiments, the method comprises storing the positioning capability 18 of the wireless device 12 in storage 24 that is at or accessible to the network node 16 (Block 320). For instance, the storage 24 may be storage of a Unified Data Management, UDM, accessible to the network node 16.

Alternatively or additionally, the method may comprise receiving a positioning request 28 for the wireless device 12 (Block 330). The method may further comprise sending the positioning request 28 to another network node 20 together with the positioning capability 18 of the wireless device 12. This other network node 20 may for instance be a positioning server in the wireless communication network 10, e.g., so as to be or implement a location management function, LMF. Regardless, in some embodiments, the positioning request 28 is sent to together with the positioning capability 18 in the sense that the positioning request 28 and the positioning capability 18 are sent within the same message. For example, the method may comprise sending a message that comprises the positioning request 28 and that includes the positioning capability 18 of the wireless device 12.

Note then that, in some embodiments, the method comprises receiving the positioning request 28 for the wireless device 12 after storing the positioning capability 18 in the storage 24. In this case, the method comprises, responsive to receiving the positioning request 28, retrieving the positioning capability 18 from the storage 24, for sending to the other network node 20 together with the positioning request 28.

Figure 4:
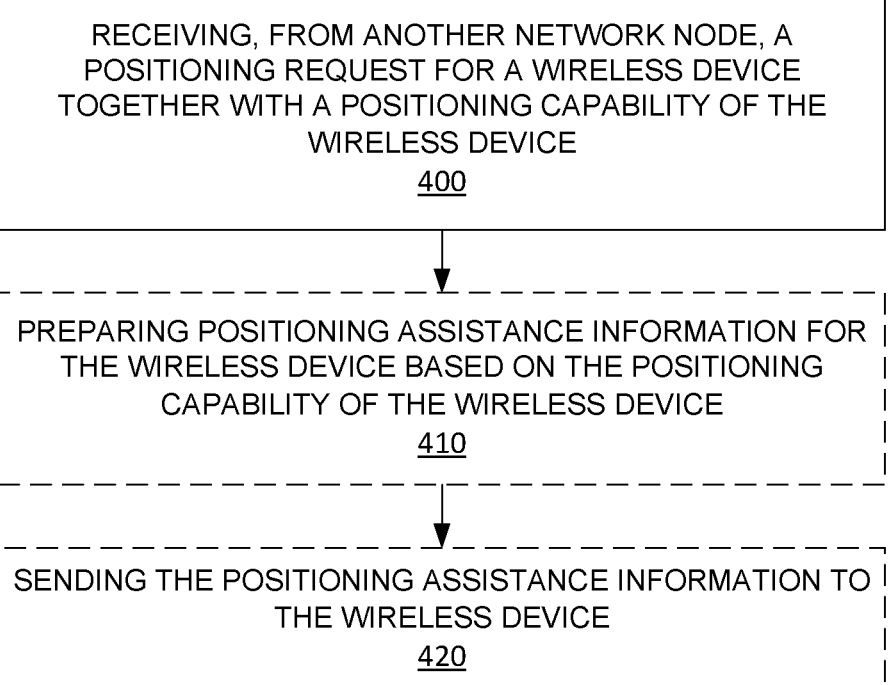
FIG. 4 is a logic flow diagram of a method performed by a network node according to other embodiments.

FIG. 4 depicts a method performed by a network node 20 configured for use in a wireless communication network 10 in accordance with still other particular embodiments. The method includes receiving, from another network node 16, a positioning request 28 for a wireless device 12 together with a positioning capability 18 of the wireless device 12 (Block 400). In some embodiments, the positioning request 28 is received together with the positioning capability 18 in the sense that the positioning request 28 and the positioning capability 18 are received within the same message. For example, the method may comprise receiving a message that comprises the positioning request 28 and that includes the positioning capability 18 of the wireless device 12.

In some embodiments, the method also comprises preparing positioning assistance information for the wireless device 12 based on the positioning capability 18 of the wireless device (Block 410). The method in this case may further comprise sending the positioning assistance information to the wireless device 12 (Block 420).

Alternatively or additionally, the method may comprise, based on the positioning request 24 being received together with the positioning capability 18, refraining from requesting the positioning capability 18 from the wireless device 12.

The positioning capability 18 in these embodiments may similarly indicate (i) one or more positioning methods supported by the wireless device 12, (ii) capabilities of the wireless device 12 to support an update of periodic assistance data, (iii) a positioning reference signal processing capability of the wireless device 12, and/or (iv) a positioning reference signal resource capability of the wireless device 12. Alternatively or additionally, the positioning capability may be a radio access technology, RAT, dependent positioning capability or a RAT-independent positioning capability. Alternatively or additionally, the positioning capability may comprise a capability related to a positioning protocol supported between the wireless device and a positioning server in the wireless communication network Embodiments herein also include corresponding apparatuses. Embodiments herein for instance include a wireless device 12 configured to perform any of the steps of any of the embodiments described above for the wireless device 12.

Embodiments also include a wireless device 12 comprising processing circuitry and power supply circuitry. The processing circuitry is configured to perform any of the steps of any of the embodiments described above for the wireless device 12. The power supply circuitry is configured to supply power to the wireless device 12.

Embodiments further include a wireless device 12 comprising processing circuitry. The processing circuitry is configured to perform any of the steps of any of the embodiments described above for the wireless device 12. In some embodiments, the wireless device 12 further comprises communication circuitry.

Embodiments further include a wireless device 12 comprising processing circuitry and memory. The memory contains instructions executable by the processing circuitry whereby the wireless device 12 is configured to perform any of the steps of any of the embodiments described above for the wireless device 12.

Embodiments moreover include a user equipment (UE). The UE comprises an antenna configured to send and receive wireless signals. The UE also comprises radio front-end circuitry connected to the antenna and to processing circuitry, and configured to condition signals communicated between the antenna and the processing circuitry. The processing circuitry is configured to perform any of the steps of any of the embodiments described above for the wireless device 12. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a network node 16, 20 configured to perform any of the steps of any of the embodiments described above for the network node 16, 20.

Embodiments also include a network node 16, 20 comprising processing circuitry and power supply circuitry. The processing circuitry is configured to perform any of the steps of any of the embodiments described above for the network node 16, 20. The power supply circuitry is configured to supply power to the network node 16, 20.

Embodiments further include a network node 16, 20 comprising processing circuitry. The processing circuitry is configured to perform any of the steps of any of the embodiments described above for the network node 16, 20. In some embodiments, the network node 16, 20 further comprises communication circuitry.

Embodiments further include a network node 16, 20 comprising processing circuitry and memory. The memory contains instructions executable by the processing circuitry whereby the network node 16, 20 is configured to perform any of the steps of any of the embodiments described above for the network node 16, 20.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 5:
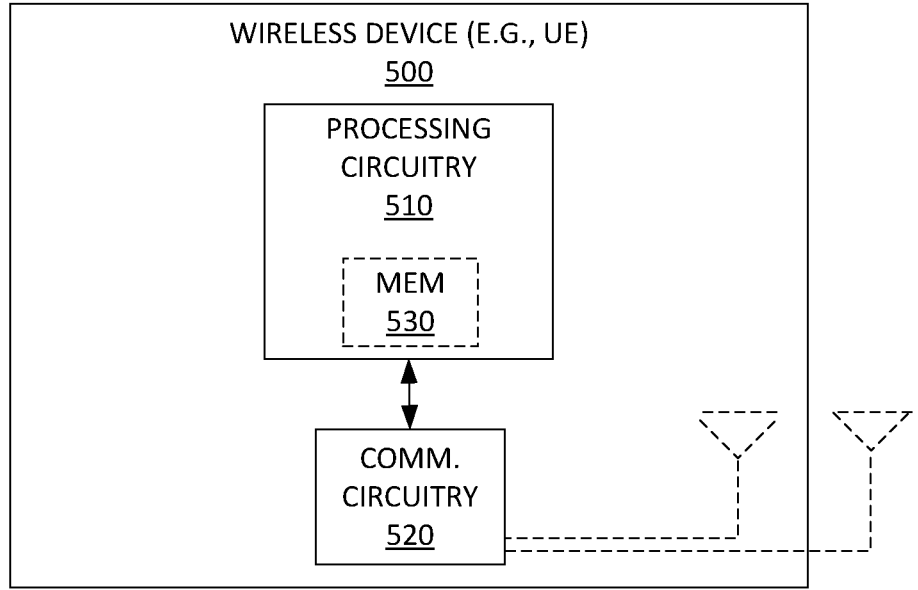
FIG. 5 is a block diagram of a wireless device according to some embodiments.

FIG. 5 for example illustrates a wireless device 500 (e.g., wireless device 12) as implemented in accordance with one or more embodiments. As shown, the wireless device 500 includes processing circuitry 510 and communication circuitry 520. The communication circuitry 520 (e.g., radio circuitry) is configured to transmit and/or receive information to and/or from one or more other nodes, e.g., via any communication technology. Such communication may occur via one or more antennas that are either internal or external to the wireless device 500. The processing circuitry 510 is configured to perform processing described above, e.g., in FIG. 2, such as by executing instructions stored in memory 530. The processing circuitry 510 in this regard may implement certain functional means, units, or modules.

Figure 6:
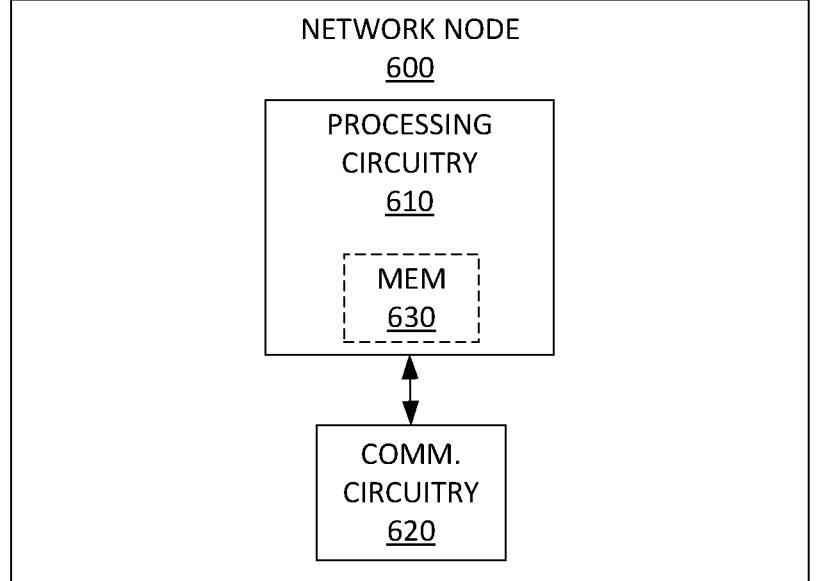
FIG. 6 is a block diagram of a network node according to some embodiments.

FIG. 6 illustrates a network node 600 (e.g., network node 16 or network node 20) as implemented in accordance with one or more embodiments. As shown, the network node 600 includes processing circuitry 610 and communication circuitry 620. The communication circuitry 620 is configured to transmit and/or receive information to and/or from one or more other nodes, e.g., via any communication technology. The processing circuitry 610 is configured to perform processing described above, e.g., in FIGS. 3 and/or 4, such as by executing instructions stored in memory 630. The processing circuitry 610 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Some embodiments herein are applicable in a wireless communication network that is or is based on a 5G network. For example, some embodiments are applicable for New Radio (NR) positioning.

Figure 7:
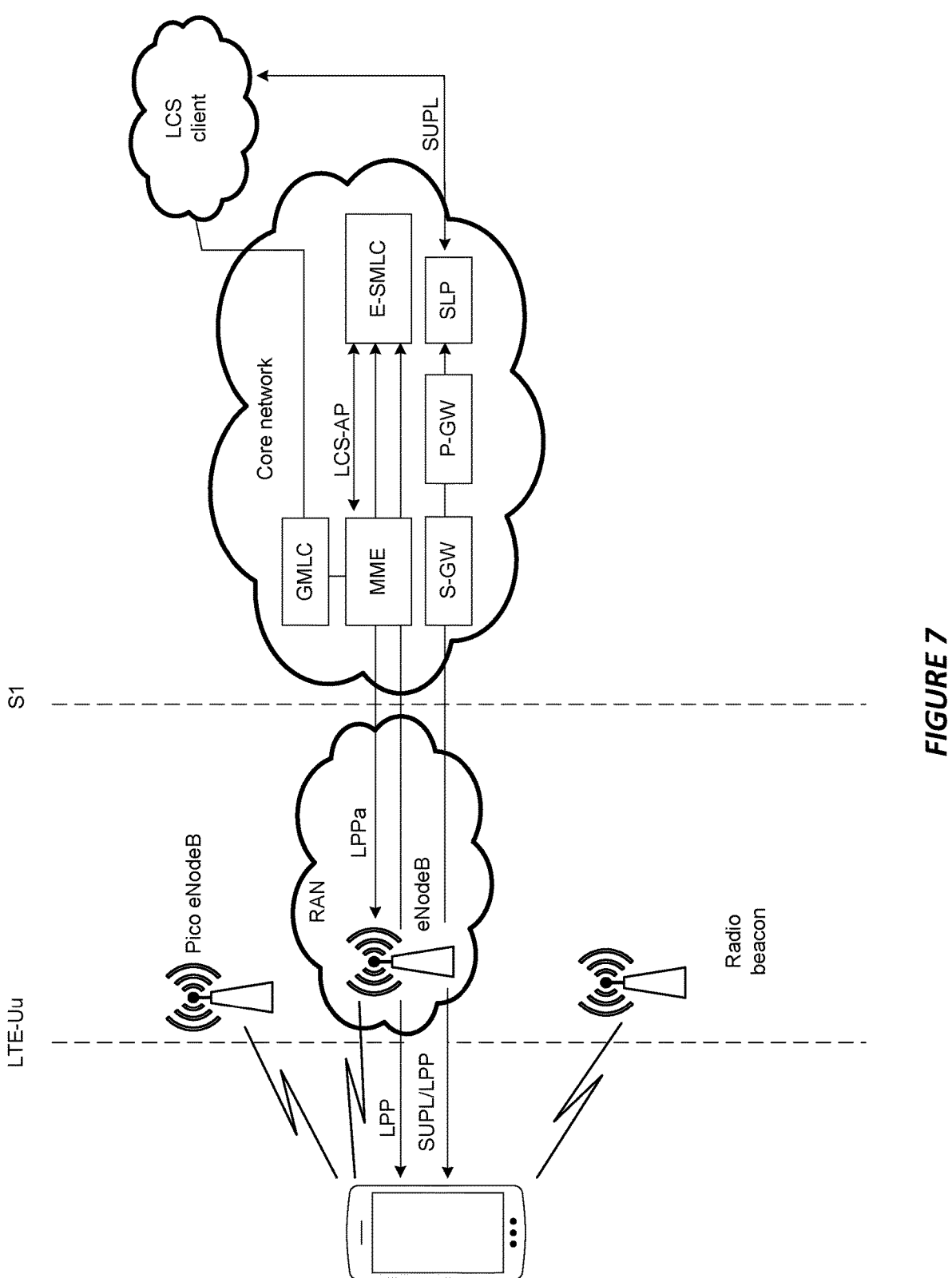
FIG. 7 is a block diagram of the positioning architecture in E-UTRA according to some embodiments.

Positioning has been a discussion in 3GPP since release 9. The positioning architecture in Long Term Evolution (LTE) is composed of three main components as shown in FIG. 7 (TS 36.305 v16.2.0). One component is the LoCation Services (LCS) client. The LCS client is the entity that sends the request for obtaining location information for a LCS target. The client can be an entity in the CN or the LCS target itself. Another component is the LCS target, which is typically a device (UE). The third component is the LCS server. The LCS server is the entity that receives the request from the client and manages positioning for an LCS target device. This entity is named the E-SMLC (evolved serving mobile location) in LTE. The E-SMLC collects measurements from the UE and base stations via defined positioning protocols (LPP and LPPa) to compute the UE positioning. Afterwards, the positioning result is sent to the LCS client with the location information.

The protocols in use for LTE positioning include the LTE Positioning Protocol (LPP) and LPPa. LPP is a point-to-point communication protocol between an e-SMLC and a device. LPPa is a communication protocol between an eNodeB and e-SMLC.

Since Release-15 and the introduction in NR, the LPP protocol between UE and location server has been agreed to be reused for UE positioning in both NR and LTE (TS 37.355 v16.2.0). At the core network, a new logical node called the Location Management Function (LMF) will be the main server responsible for computing the UE position, based on the NR, E-UTRA, or both radio access technologies (RATs) specific positioning methods.

In the NR architecture, an NG-RAN node is connected towards the core network (CN) via the NG interface. Due to this new interface between the RAN and CN, a new protocol called NR Positioning Protocol A (NRPPa) is defined (TS 38.455 v16.1.0) to transfer the positioning information between NG-RAN and Location management Function (LMF).

Figure 8:
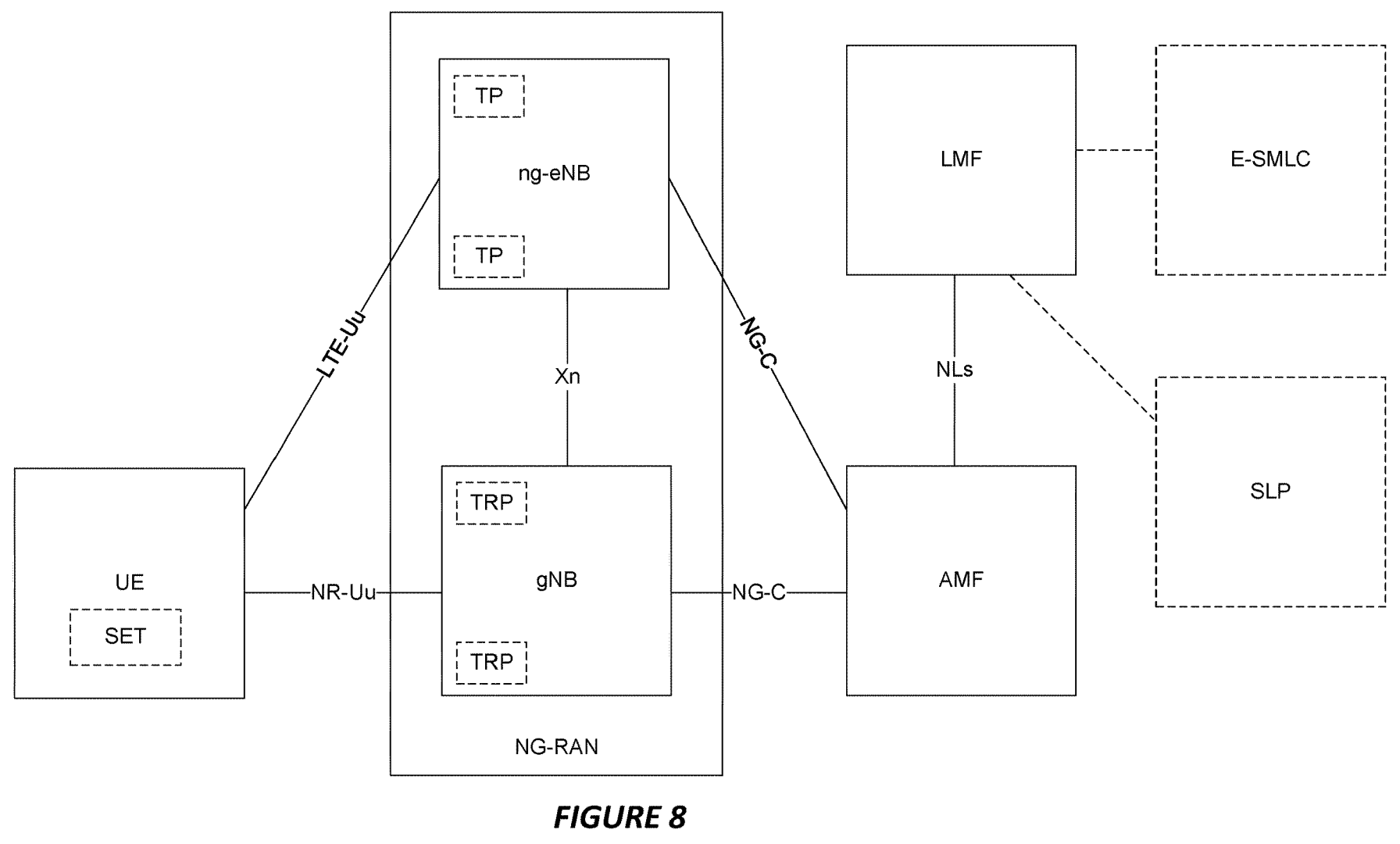

The NR Positioning architecture is defined in FIG. 8 (TS 38.305 v16.2.0). The Access and Mobility Function (AMF) receives a request for some location service associated with a particular target UE from another entity (e.g., Gateway Mobile Location Centre, GMLC, or UE) or the AMF itself decides to initiate some location service on behalf of a particular target UE (e.g., for an Internet Protocol, IP, Multimedia Subsystem, IMS, emergency call from the UE) as described in TS 23.502 v16.6.0 and TS 23.273 v16.4.0. The AMF then sends a location services request to an LMF. The LMF processes the location services request which may include transferring assistance data to the target UE to assist with UE-based and/or UE-assisted positioning and/or may include positioning of the target UE. The LMF then returns the result of the location service back to the AMF (e.g., a position estimate for the UE). In the case of a location service requested by an entity other than the AMF (e.g., a GMLC or UE), the AMF returns the location service result to this entity.

An NG-RAN node may control several transmission reception points (TRPs)/transmission points (TPs), such as remote radio heads, or downlink positioning reference signal only (DL-PRS-only) TPs for support of PRS-based terrestrial beacon system (TBS).

An LMF may have a proprietary signaling connection to an E-SMLC which may enable an LMF to access information from E UTRAN (e.g., to support the observed time difference of arrival, OTDOA, for E-UTRA positioning method using downlink measurements obtained by a target UE of signals from eNBs and/or PRS-only TPs in E-UTRAN). Details of the signalling interaction between an LMF and E-SMLC are outside the scope of this specification.

In Rel-17 NR Positioning, latency is to be optimized for NR Positioning that can meet the target latency requirement of <100 ms; and for industrial internet of things (IIoT) use cases, latency in the order of 10 ms is desired.

Therefore, while keeping the positioning NR architecture and the existing positioning technique as they have been defined in Rel-16, signaling and procedures for improved accuracy, reduced latency, network efficiency, and device efficiency are needed.

There currently exist certain challenge(s) in this regard, for which some embodiments provide a solution. There is an increasing demand on the number of use-cases which require positioning. Moreover, the positioning demands in terms of different performance metrics such as accuracy, latency, and reliability are enhancing. The positioning use-cases within the ultra reliability low-latency communication (URLLC) domain are also facing challenging conditions in terms of deriving positioning estimations with very low latency requirements. While the latency in respect to the nodes in the core network are not the main part of the positioning latency, however, with a proper communication mechanism and data handling within these core nodes, it is possible to systematically reduce the positioning latency for all UEs, which overall would have a significant impact.

Heretofore, the AMF sends the positioning request to the LMF over the NLs interface in the core network (CN). This interface is transparent to everything UE or RAN-related and only signals LPP or NRPPa information.

Figure 9:
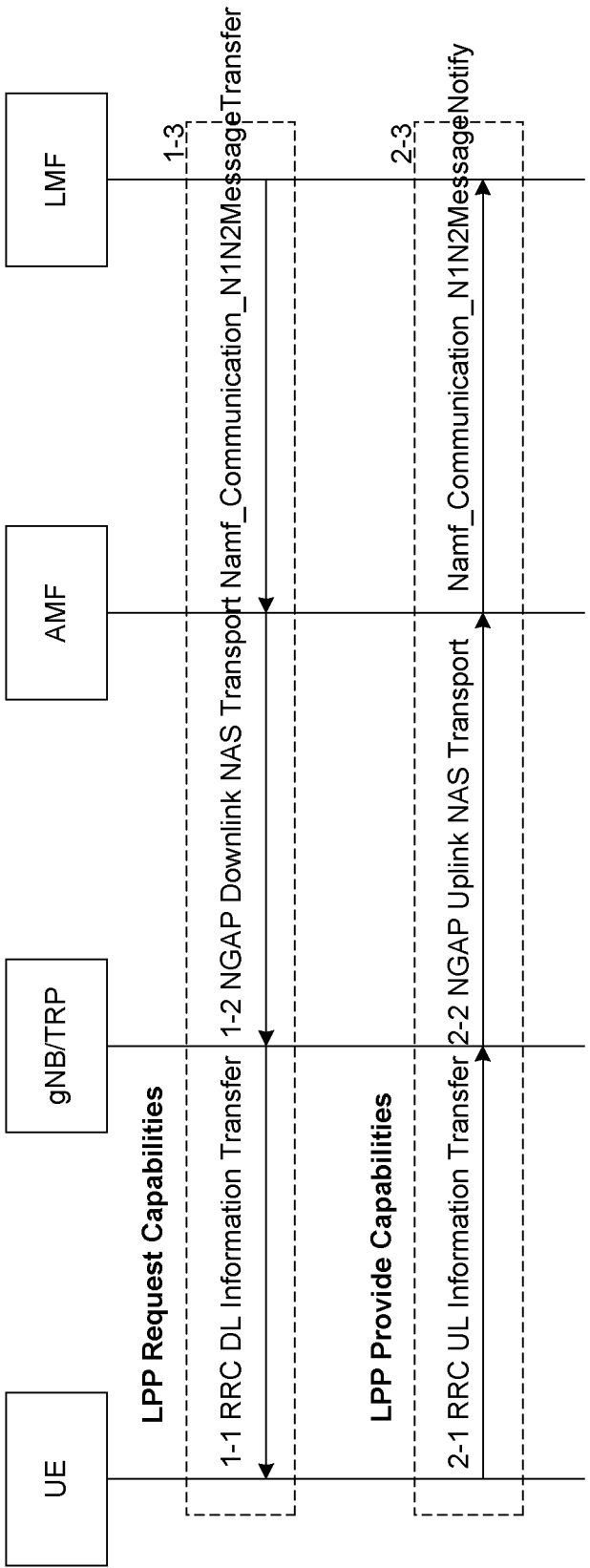
FIG. 9 is a call flow diagram for Long Term Evolution Positioning Protocol (LPP) user equipment (UE) capability retrieval in the prior art.

In particular, in order to obtain UE capability as shown in FIG. 9, several hops are heretofore needed. The LPP request capabilities need to be relayed by AMF to gNB and finally to the UE via the control plane. Similarly, the message then in the uplink (UL) would be relayed using the same hops. This can cause up to 80 ms to obtain the UE capability in LMF.

Further, in some embodiments, a centralized AMF can be connected to multiple LMFs located in different sites in a big industrial network or city. The LMFs/LCS servers can be deployed in different sites far away from the AMF location depending on the location services requirements (e.g., LMFs deployed close to gNB for stringent QoS such as low latency and/or high accuracy). The centralized AMF would handle not only registration services for LCS target location requests, but also for typical cellular UEs that are coexisting in the same industrial area. Thus, a single centralized AMF will handle multiple UE subscriptions in those separated sites at the same time over CP signaling, and trigger dedicated requests of UEs positioning capabilities for different LMFs. This would heretofore lead to increased latency in the backhaul network and congestion of the NLs interface.

Certain aspects of the present disclosure and their embodiments may provide solutions to these or other challenges. For example, in order to improve the overall latency and minimize the delay in the CN—especially in the backhaul network—some embodiments herein improve the interconnection between the LMF and AMF.

In particular, some embodiments enable fast capability retrieval of the UE to improve the latency in the CN between the LMF and AMF—considering the case of a backhaul network interconnecting multiple LMFs to the same centralized AMF. A mechanism based on providing the positioning capabilities of the LCS target device to the AMF during the UE registration procedure is provided. The AMF stores the capabilities and provides it to the LMF when requesting/relaying information for determining UE positioning from LCS clients.

As used herein, the terms UE, target device, and LCS target device are used interchangeably. The below steps of some embodiments are provided for the network node 1 (e.g., AMF), the network node 2 (e.g., LMF), and the target device, respectively. Network node 1 is an example of network node 16 in FIG. 1, and network node 2 is an example of network node 20 in FIG. 1. The UE is an example of wireless device 12 in FIG. 1. The positioning capability as discussed below is an example of positioning capability 18 in FIG. 1.

Figure 10:
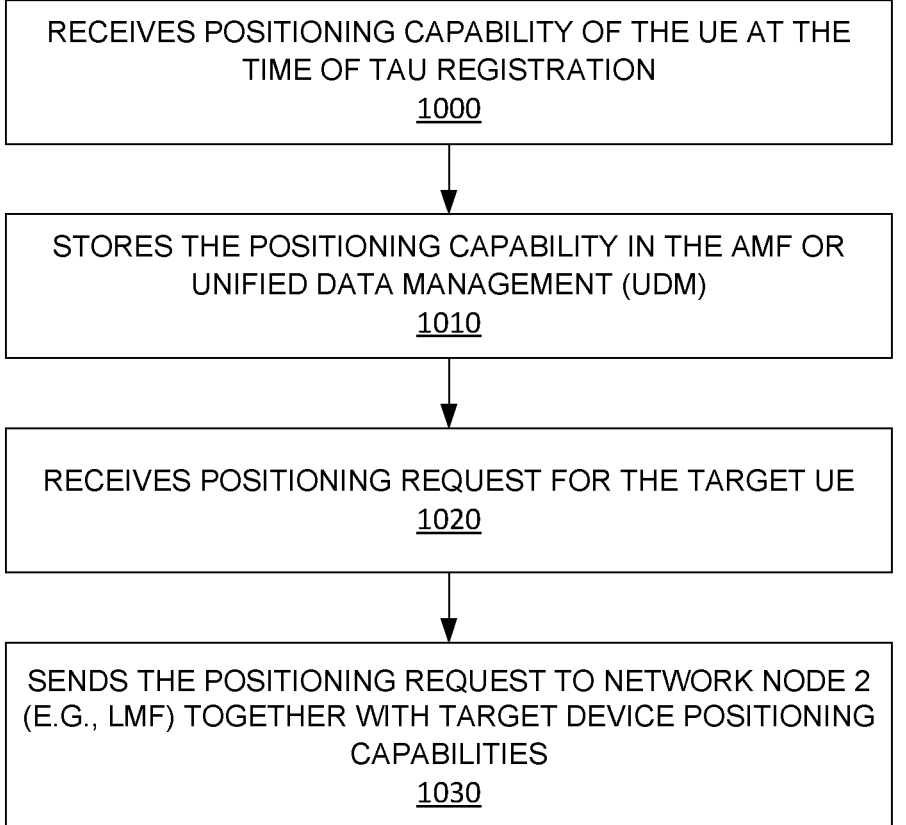
FIG. 10 is a logic flow diagram of a method performed by a network node (e.g., AMF) according to some embodiments.

FIG. 10 shows the steps from network node 1 (e.g., AMF) perspective according to some embodiments.

Step 1000. Receives positioning capability of the UE at the time of TAU registration. Here, the positioning capability may be received within a message 14 at the time of TAU registration, as an example of the sort of message 14 in FIG. 1.

Step 1010. Stores the positioning capability in the AMF or Unified Data Management (UDM), e.g., as an example of storage 24 in FIG. 1. Other examples of storage is he tUE Radio Capability management function (UCMF) or in a new management function dedicated for positioning Capabilities (e.g. a UE positioning Capability Management Function).

Step 1020. Receives positioning request for the target UE.

Step 1030. Sends the positioning request to network node 2 (e.g., LMF) together with target device positioning capabilities.

Figure 11:
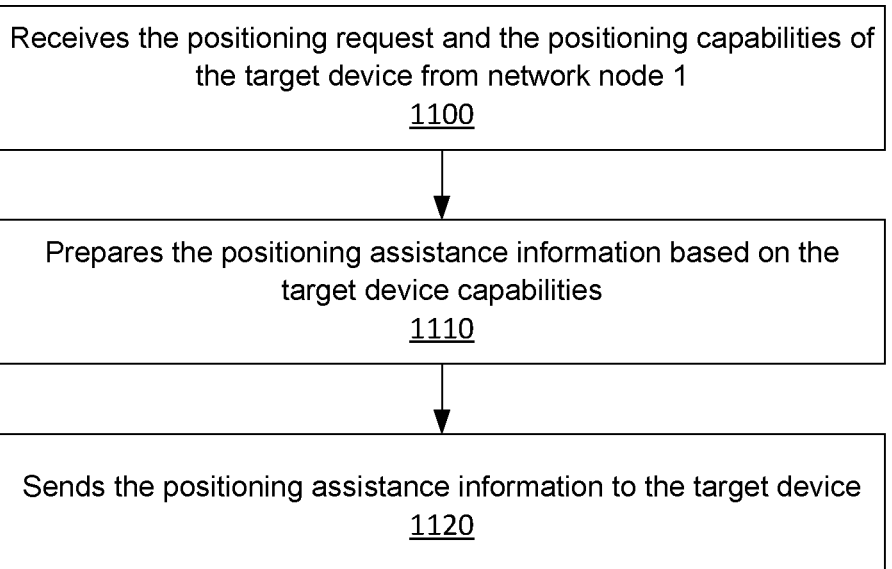
FIG. 11 is a logic flow diagram of a method performed by a network node (e.g., LMF) according to some embodiments.

FIG. 11 shows the steps from network node 2 (e.g., LMF) perspective according to some embodiments.

Step 1100. Receives the positioning request and the positioning capabilities of the target device from network node 1.

Step 1110. Prepares the positioning assistance information based on the target device capabilities.

Step 1120. Sends the positioning assistance information to the target device.

Note that the capability signaling between the target device and network node 2 are omitted.

FIG. 12 shows steps from the target device perspective according to some embodiments.

Step 1200. At the time of TAU, the positioning capabilities are also reported to network node 1.

Step 1210. At the time of positioning request, the target device directly receives the positioning assistance information from network node 2.

Some embodiments impact the memory usage of the UDM node in 5G, which can be optimized by proper coding of the positioning capabilities. Moreover, as the positioning capabilities of the target device would not change much during time, in one embodiment, network node 1 simply ACK/NACK the information stored in UDM for the target device at the time of new tracking area update (TAU) and reduces overwriting similar information at each occasion.

Some embodiments provide latency reduced capability fetching between AMF/LMF and UE for positioning.

Certain embodiments may provide one or more of the following technical advantage(s). One technical advantage of some embodiments is that the "pro-active" signaling of UE positioning capabilities during the registration procedure can improve the latency in the CN and reduce the overhead in the NLs signaling message. Alternatively or additionally, some embodiments ensure co-existence of a centralized AMF handling multiple subscriptions of UEs scattered in an immense industrial area. Alternatively or additionally, some embodiments reduce the amount of backhaul signaling.

Figure 13:
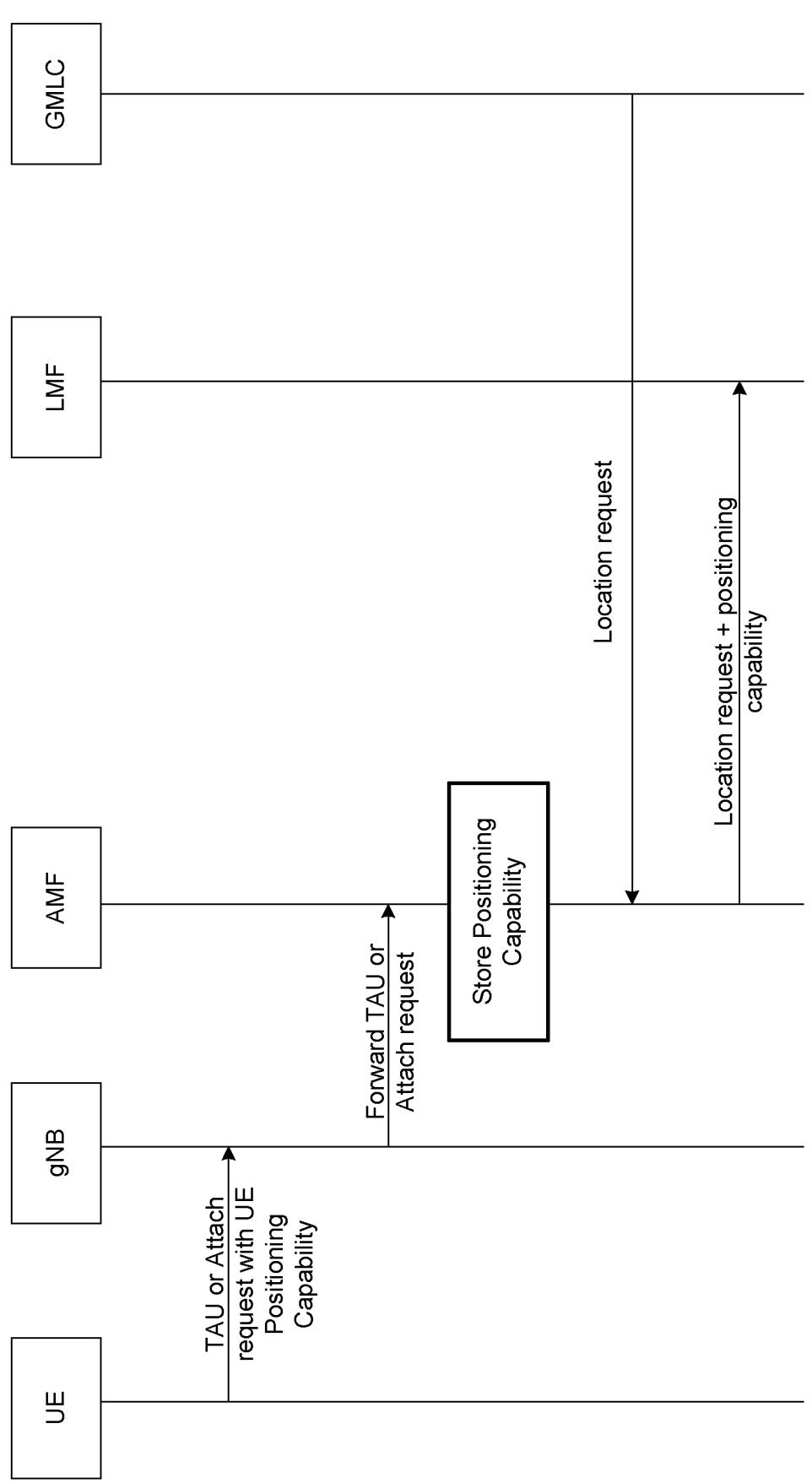
FIG. 13 is a call flow diagram for positioning capability handling according to some embodiments.

FIG. 13 shows an enhanced Attach/TAU procedure and enhanced AMF to LMF signaling according to some embodiments, for providing UE positioning capability during the TAU or attach procedure.

In particular, the UE during TAU/registration or attach procedure includes the UE positioning capability, e.g., where the TAU/attach request is an example of message 14 in FIG. 1. This capability is stored in AMF, e.g., as an example of network node 16. When AMF receives a location request from an external client such as GMLC or another client such as UE during a mobile originated (MP) location request (MO-LR) procedure, the AMF includes the positioning capability to LMF, e.g., as an example of network node 20. In this case, the location request+positioning capability is one example of signaling 26 in FIG. 1.

For the case when AMF does not have any capability stored for the UE, it indicates such information to LMF or absence of such information implicitly indicate that AMF does not have UE capability.

In such case, the legacy procedure is followed by LMF to obtain UE capability. This is notified to AMF; and hence when UE provides the capability, the AMF stores it and forwards to the LMF.

In such case, the LPP UE capability shown in FIG. 3: the steps 2-1 RRC UL Information Transfer & 2-2 NGAP Uplink NAS Transport is marked such that UE positioning capability is included so that AMF decodes and stores that. Alternatively, if AMF is not able to obtain the capability, it may fetch it from LMF and store it.

Positioning Capability while Fetching Ciphering Keys

Alternatively or additionally, when a UE capable of performing positioning requests for ciphering keys from AMF, the AMF identifies/learns that this UE is positioning capable and hence it verifies whether it has positioning capability for the UE or not. If the positioning capability is missing, it subsequently requests the UE to provide the capability.

In an embodiment, during the initial LCS Target UE registration procedure to the AMF for asking for the positioning ciphering keys, the AMF will identify that the UE is positioning capable and hence obtain capability only from such UE. The AMF will verify if it has the UE positioning capability stored or not, and if not, then in a subsequent message or in new signaling, the AMF requests the UE to provide positioning capability.

Enhanced MO-LR Procedure

Further as part of a mobile-originated (MO) location request (LR) (MO-LR) procedure, when the UE asks for any assistance data or location request, the AMF verifies if it has UE positioning capability stored or not. If it does not have capability stored, it obtains the UE positioning capability using the NAS signaling; a new signaling is defined to fetch or existing signaling is extended to include that. This new signaling is an example of message 14 in FIG. 1.

Figure 14:
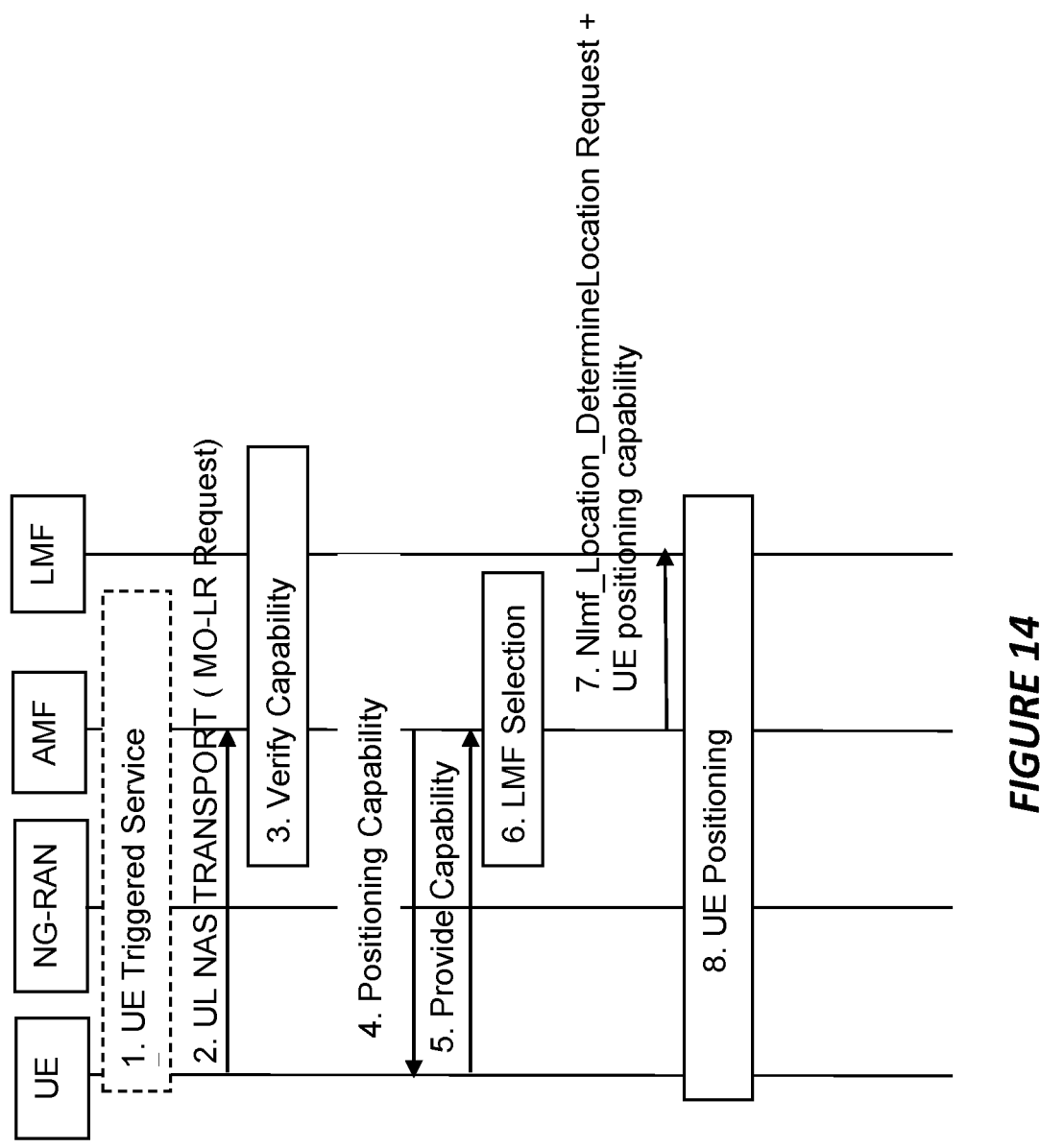
FIG. 14 is a call flow diagram for positioning capability handling according to other embodiments.

As shown in FIG. 14, step 3 to step 7 is a new procedure and signaling flow for the MO-LR procedure to retrieve UE capability and provide it to LMF. Steps 4 and 5 are optional depending upon whether the capability is already stored/available in AMF or not. The Provide Capability in Step 5 is one example of message 14 in FIG. 1. The Nlmf_Location_Determination_Request+UE positioning capability in Step 7 is one example of signaling 26 in FIG. 1.

Alternatively, the step 2 UL NAS transport message can be updated as below (as modified from the existing procedure description from 3GPP TS 23.273 v16.4.0 section 6.2). In this case, the step 2 UL NAS transport message is another example of message 14 in FIG. 1.

2) The UE sends an MO-LR Request message included in a UL NAS TRANSPORT message. The MO-LR Request may optionally include an LPP positioning message. Different types of location services can be requested: location estimate of the UE, location estimate of the UE to be sent to an LCS client or application function (AF), or location assistance data. If the UE is requesting its own location or that its own location be sent to an LCS client or AF, this message carries LCS requested quality of service (QoS) information (e.g. accuracy, response time, LCS QoS Class), the requested maximum age of location and the requested type of location (e.g. "current location", "current or last known location"). If the UE is requesting that its location be sent to an LCS client, the message shall include the identity of the LCS client or the AF, and may include the address of the GMLC through which the LCS client or AF (via Network Exposure Function, NEF) should be accessed. In addition, a Service Identity indicates which MO-LR service of the LCS Client is requested by the UE may be included. The message also may include a pseudonym indicator to indicate a pseudonym should be assigned by the network and transferred to the LCS Client as the UE's identity. If the UE is instead requesting location assistance data, the embedded LPP message specifies the type of assistance data and the positioning method for which the assistance data applies. The UE may also embed positioning UE capabilities as one of the LPP message. The capability may be associated to the positioning method for which the UE requests assistance data or may include capabilities applicable for multiple procedures.

For an LCS 5GC-MO-LR requesting location transfer to an LCS Client or application function (AF), the AMF shall assign a GMLC address, i.e. VGMLC address, which is stored in the AMF. If a VGMLC address is not available, the AMF may reject the location request. The AMF verifies the subscription profile of the UE and decides if the requested service is allowed or not.

In a further embodiment, a timer is set by AMF or any network node which governs the time interval when the UE shall provide the capability unsolicited. If the timer is ruining, the UE may assume that the AMF has already the capability and thus UE may not provide.

Enhanced MT-LR

Figure 15:
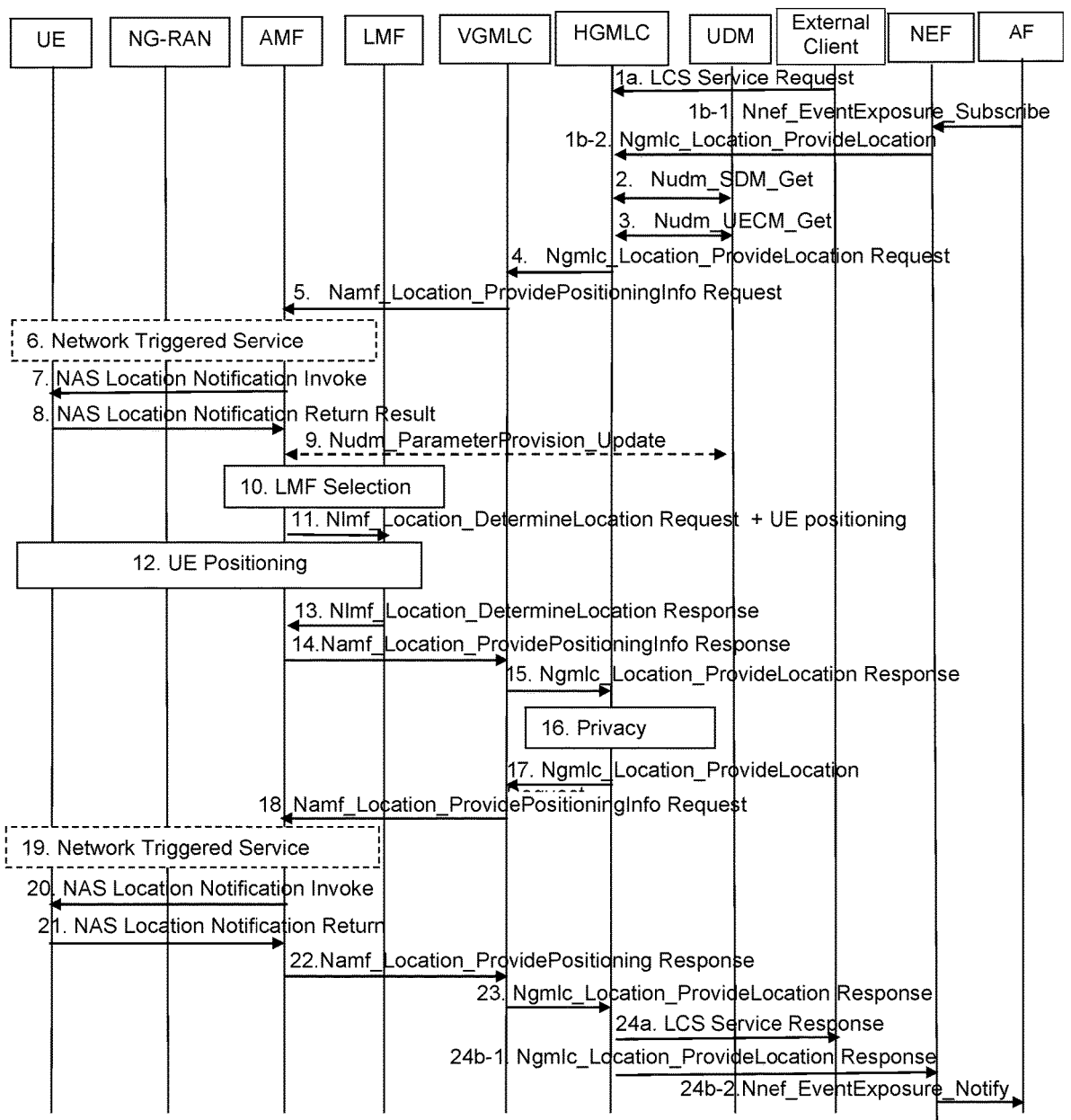
FIG. 15 is a call flow diagram for positioning capability handling according to yet other embodiments.

In some embodiments, the MT-LR procedure is enhanced in such a way that the capabilities are pre-fetched from the UE to save the latency. In this case, once AMF receives the request from an external client, it verifies if it already has the capability for the UE or not. If it does not have, it fetches the UE using (an exemplary) step 7, step 8, and step 11 as shown in FIG. 15. For step 11 based, FIG. 15 in step 11 has been updated to show UE positioning capability.

In this case, the NAS Location Notification Return Result message in Step 8 is one example of message 14 in FIG. 1. The Nlmf_Location_Determination_Request+UE positioning capability in Step 11 is one example of signaling 26 in FIG. 1.

Regarding Step 7 in FIG. 15: if the indicator of privacy check related action indicates that the UE must either be notified or notified with privacy verification and if the UE supports LCS notification (according to the UE capability information), a notification invoke message is sent to the target UE, indicating the identity of the LCS client the Requestor Identity (if that is both supported and available) and whether privacy verification is required. AMF may include a field to indicate the need of UE Positioning capability.

Regarding Step 8 in FIG. 15: The target UE notifies the UE user of the location request and, if privacy verification was requested, waits for the user to grant or withhold permission. The UE then returns a notification result to the AMF indicating, if privacy verification was requested, whether permission is granted or denied for the current LCS request. If the UE user does not respond after a predetermined time period, the AMF shall infer a "no response" condition. The AMF shall return an error response to the (H)GMLC if privacy verification was requested and either the UE user denies permission or there is no response with the UE privacy profile received from the (H)GMLC indicating barring of the location request.

The notification result also indicates the Location Privacy Indication setting for subsequent LCS requests; i.e whether subsequent LCS requests, if generated, will be allowed or disallowed by the UE. The Location Privacy Indication may also indicate a time for disallowing the subsequent LCS requests.

UE shall provide the positioning capability if AMF has requested in step 7.

Regarding Step 11 in FIG. 15: The AMF invokes the Nlmf_Location_DetermineLocation service operation towards the LMF to request the current location of the UE. The service operation includes a LCS Correlation identifier, the serving cell identity of the Primary Cell in the Master RAN node and the Primary Cell in the Secondary RAN node when available based on Dual Connectivity scenarios, and the client type and may include an indication if UE supports LPP, the required QoS and Supported GAD shapes. If any of the procedures in clause 6.11.1 or clause 6.11.2 are used the service operation includes the AMF identity. AMF may include the UE Positioning capabilities.

UL Sounding Reference Signal (SRS) Capability Heretofore, UL SRS capability is provided to gNB as gNB configures the UL SRS resources. The UL SRS capability is uploaded in AMF by gNB and fetched when needed by gNB from AMF. By contrast, in some embodiments herein, the AMF may also append the UL SRS capability and provide to LMF; for example, in step 11 from the above section on Enhanced MT-LR.

Methods to Report Capability from UE

In some embodiments, the positioning capability that UE reports in message 14 (E.g., during attach or TAU procedure) can be made generic and some categorization can also be done such as RAT dependent capability and RAT independent capability. One task is to optimize the capability indication bits. Hence, bitmaps can be used such that the meaning of each bitmap is known prior to the network node and UE.

An example where UE Positioning capability is provided as below which has been categorized into RAT dependent, RAT independent (RAT independent may also include hybrid and sensor-based method capabilities), or separate capability may also be included for this.

However, the positioning reference signal (PRS) capability is the one which contains many parameters and may have to be provided separately or contained in separate information element (IE).

An example structure is provided below.

UEPositioningCapabilities::=SEQUENCE {
  UEPosCapRatDependent-r17 BIT STRING {ul-srs (0), dl-prs-rsrp(1), additionalPath(2)} (SIZE(1 . . . 32)),
  UEPosCapRatInDependent-r17 BIT STRING {a-gnss (0), gnss-rtk(1), bt(2), wifi(3)} (SIZE(1 . . . 16)),
  UEPosCapHybrid-r17 BIT STRING {imu(0), gnss-dl-TDOA(1)} (SIZE(1 . . . 16)),
  UEPRS-Capability-r17 NR-DL-PRS-ResourcesCapability-r16

Figure 16:
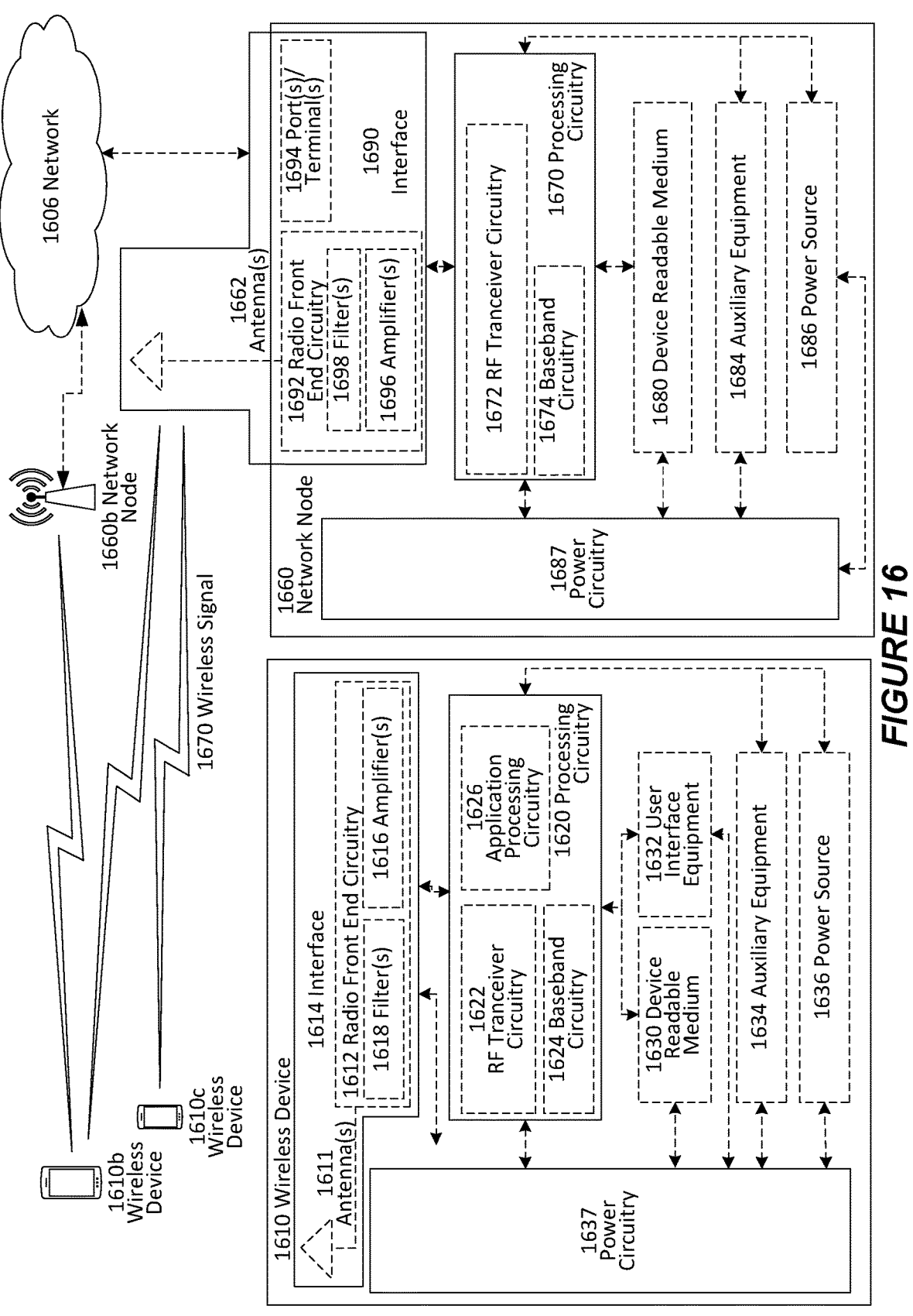
FIG. 16 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 16. For simplicity, the wireless network of FIG. 16 only depicts network 1606, network nodes 1660 and 1660*b*, and WDs 1610, 1610*b*, and 1610*c*. In practice, a wireless network may further include any additional elements suitable to support communication between wireless devices or between a wireless device and another communication device, such as a landline telephone, a service provider, or any other network node or end device. Of the illustrated components, network node 1660 and wireless device (WD) 1610 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1606 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1660 and WD 1610 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 16, network node 1660 includes processing circuitry 1670, device readable medium 1680, interface 1690, auxiliary equipment 1684, power source 1686, power circuitry 1687, and antenna 1662. Although network node 1660 illustrated in the example wireless network of FIG. 16 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1660 are depicted as single boxes located within a larger box, or nested within multiple boxes, in practice, a network node may comprise multiple different physical components that make up a single illustrated component (e.g., device readable medium 1680 may comprise multiple separate hard drives as well as multiple RAM modules).

Similarly, network node 1660 may be composed of multiple physically separate components (e.g., a NodeB component and a RNC component, or a BTS component and a BSC component, etc.), which may each have their own respective components. In certain scenarios in which network node 1660 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1660 may be configured to support multiple radio access technologies (RATs). In such embodiments, some components may be duplicated (e.g., separate device readable medium 1680 for the different RATs) and some components may be reused (e.g., the same antenna 1662 may be shared by the RATs). Network node 1660 may also include multiple sets of the various illustrated components for different wireless technologies integrated into network node 1660, such as, for example, GSM, WCDMA, LTE, NR, WiFi, or Bluetooth wireless technologies. These wireless technologies may be integrated into the same or different chip or set of chips and other components within network node 1660.

Processing circuitry 1670 is configured to perform any determining, calculating, or similar operations (e.g., certain obtaining operations) described herein as being provided by a network node. These operations performed by processing circuitry 1670 may include processing information obtained by processing circuitry 1670 by, for example, converting the obtained information into other information, comparing the obtained information or converted information to information stored in the network node, and/or performing one or more operations based on the obtained information or converted information, and as a result of said processing making a determination.

Processing circuitry 1670 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1660 components, such as device readable medium 1680, network node 1660 functionality. For example, processing circuitry 1670 may execute instructions stored in device readable medium 1680 or in memory within processing circuitry 1670. Such functionality may include providing any of the various wireless features, functions, or benefits discussed herein. In some embodiments, processing circuitry 1670 may include a system on a chip (SOC).

In some embodiments, processing circuitry 1670 may include one or more of radio frequency (RF) transceiver circuitry 1672 and baseband processing circuitry 1674. In some embodiments, radio frequency (RF) transceiver circuitry 1672 and baseband processing circuitry 1674 may be on separate chips (or sets of chips), boards, or units, such as radio units and digital units. In alternative embodiments, part or all of RF transceiver circuitry 1672 and baseband processing circuitry 1674 may be on the same chip or set of chips, boards, or units In certain embodiments, some or all of the functionality described herein as being provided by a network node, base station, eNB or other such network device may be performed by processing circuitry 1670 executing instructions stored on device readable medium 1680 or memory within processing circuitry 1670. In alternative embodiments, some or all of the functionality may be provided by processing circuitry 1670 without executing instructions stored on a separate or discrete device readable medium, such as in a hard-wired manner. In any of those embodiments, whether executing instructions stored on a device readable storage medium or not, processing circuitry 1670 can be configured to perform the described functionality. The benefits provided by such functionality are not limited to processing circuitry 1670 alone or to other components of network node 1660, but are enjoyed by network node 1660 as a whole, and/or by end users and the wireless network generally.

Device readable medium 1680 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1670. Device readable medium 1680 may store any suitable instructions, data or information, including a computer program, software, an application including one or more of logic, rules, code, tables, etc. and/or other instructions capable of being executed by processing circuitry 1670 and, utilized by network node 1660. Device readable medium 1680 may be used to store any calculations made by processing circuitry 1670 and/or any data received via interface 1690. In some embodiments, processing circuitry 1670 and device readable medium 1680 may be considered to be integrated.

Interface 1690 is used in the wired or wireless communication of signalling and/or data between network node 1660, network 1606, and/or WDs 1610. As illustrated, interface 1690 comprises port(s)/terminal(s) 1694 to send and receive data, for example to and from network 1606 over a wired connection. Interface 1690 also includes radio front end circuitry 1692 that may be coupled to, or in certain embodiments a part of, antenna 1662. Radio front end circuitry 1692 comprises filters 1698 and amplifiers 1696. Radio front end circuitry 1692 may be connected to antenna 1662 and processing circuitry 1670. Radio front end circuitry may be configured to condition signals communicated between antenna 1662 and processing circuitry 1670. Radio front end circuitry 1692 may receive digital data that is to be sent out to other network nodes or WDs via a wireless connection. Radio front end circuitry 1692 may convert the digital data into a radio signal having the appropriate channel and bandwidth parameters using a combination of filters 1698 and/or amplifiers 1696. The radio signal may then be transmitted via antenna 1662. Similarly, when receiving data, antenna 1662 may collect radio signals which are then converted into digital data by radio front end circuitry 1692. The digital data may be passed to processing circuitry 1670. In other embodiments, the interface may comprise different components and/or different combinations of components.

In certain alternative embodiments, network node 1660 may not include separate radio front end circuitry 1692, instead, processing circuitry 1670 may comprise radio front end circuitry and may be connected to antenna 1662 without separate radio front end circuitry 1692. Similarly, in some embodiments, all or some of RF transceiver circuitry 1672 may be considered a part of interface 1690. In still other embodiments, interface 1690 may include one or more ports or terminals 1694, radio front end circuitry 1692, and RF transceiver circuitry 1672, as part of a radio unit (not shown), and interface 1690 may communicate with baseband processing circuitry 1674, which is part of a digital unit (not shown).

Antenna 1662 may include one or more antennas, or antenna arrays, configured to send and/or receive wireless signals. Antenna 1662 may be coupled to radio front end circuitry 1690 and may be any type of antenna capable of transmitting and receiving data and/or signals wirelessly. In some embodiments, antenna 1662 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1662 may be separate from network node 1660 and may be connectable to network node 1660 through an interface or port.

Antenna 1662, interface 1690, and/or processing circuitry 1670 may be configured to perform any receiving operations and/or certain obtaining operations described herein as being performed by a network node. Any information, data and/or signals may be received from a wireless device, another network node and/or any other network equipment. Similarly, antenna 1662, interface 1690, and/or processing circuitry 1670 may be configured to perform any transmitting operations described herein as being performed by a network node. Any information, data and/or signals may be transmitted to a wireless device, another network node and/or any other network equipment.

Power circuitry 1687 may comprise, or be coupled to, power management circuitry and is configured to supply the components of network node 1660 with power for performing the functionality described herein. Power circuitry 1687 may receive power from power source 1686. Power source 1686 and/or power circuitry 1687 may be configured to provide power to the various components of network node 1660 in a form suitable for the respective components (e.g., at a voltage and current level needed for each respective component). Power source 1686 may either be included in, or external to, power circuitry 1687 and/or network node 1660. For example, network node 1660 may be connectable to an external power source (e.g., an electricity outlet) via an input circuitry or interface such as an electrical cable, whereby the external power source supplies power to power circuitry 1687. As a further example, power source 1686 may comprise a source of power in the form of a battery or battery pack which is connected to, or integrated in, power circuitry 1687. The battery may provide backup power should the external power source fail. Other types of power sources, such as photovoltaic devices, may also be used.

Alternative embodiments of network node 1660 may include additional components beyond those shown in FIG. 16 that may be responsible for providing certain aspects of the network node's functionality, including any of the functionality described herein and/or any functionality necessary to support the subject matter described herein. For example, network node 1660 may include user interface equipment to allow input of information into network node 1660 and to allow output of information from network node 1660. This may allow a user to perform diagnostic, maintenance, repair, and other administrative functions for network node 1660.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1610 includes antenna 1611, interface 1614, processing circuitry 1620, device readable medium 1630, user interface equipment 1632, auxiliary equipment 1634, power source 1636 and power circuitry 1637. WD 1610 may include multiple sets of one or more of the illustrated components for different wireless technologies supported by WD 1610, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1610.

Antenna 1611 may include one or more antennas or antenna arrays, configured to send and/or receive wireless signals, and is connected to interface 1614. In certain alternative embodiments, antenna 1611 may be separate from WD 1610 and be connectable to WD 1610 through an interface or port. Antenna 1611, interface 1614, and/or processing circuitry 1620 may be configured to perform any receiving or transmitting operations described herein as being performed by a WD. Any information, data and/or signals may be received from a network node and/or another WD. In some embodiments, radio front end circuitry and/or antenna 1611 may be considered an interface.

As illustrated, interface 1614 comprises radio front end circuitry 1612 and antenna 1611. Radio front end circuitry 1612 comprise one or more filters 1618 and amplifiers 1616. Radio front end circuitry 1614 is connected to antenna 1611 and processing circuitry 1620, and is configured to condition signals communicated between antenna 1611 and processing circuitry 1620. Radio front end circuitry 1612 may be coupled to or a part of antenna 1611. In some embodiments, WD 1610 may not include separate radio front end circuitry 1612; rather, processing circuitry 1620 may comprise radio front end circuitry and may be connected to antenna 1611. Similarly, in some embodiments, some or all of RF transceiver circuitry 1622 may be considered a part of interface 1614. Radio front end circuitry 1612 may receive digital data that is to be sent out to other network nodes or WDs via a wireless connection. Radio front end circuitry 1612 may convert the digital data into a radio signal having the appropriate channel and bandwidth parameters using a combination of filters 1618 and/or amplifiers 1616. The radio signal may then be transmitted via antenna 1611. Similarly, when receiving data, antenna 1611 may collect radio signals which are then converted into digital data by radio front end circuitry 1612. The digital data may be passed to processing circuitry 1620. In other embodiments, the interface may comprise different components and/or different combinations of components.

Processing circuitry 1620 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1610 components, such as device readable medium 1630, WD 1610 functionality. Such functionality may include providing any of the various wireless features or benefits discussed herein. For example, processing circuitry 1620 may execute instructions stored in device readable medium 1630 or in memory within processing circuitry 1620 to provide the functionality disclosed herein.

As illustrated, processing circuitry 1620 includes one or more of RF transceiver circuitry 1622, baseband processing circuitry 1624, and application processing circuitry 1626. In other embodiments, the processing circuitry may comprise different components and/or different combinations of components. In certain embodiments processing circuitry 1620 of WD 1610 may comprise a SOC. In some embodiments, RF transceiver circuitry 1622, baseband processing circuitry 1624, and application processing circuitry 1626 may be on separate chips or sets of chips. In alternative embodiments, part or all of baseband processing circuitry 1624 and application processing circuitry 1626 may be combined into one chip or set of chips, and RF transceiver circuitry 1622 may be on a separate chip or set of chips. In still alternative embodiments, part or all of RF transceiver circuitry 1622 and baseband processing circuitry 1624 may be on the same chip or set of chips, and application processing circuitry 1626 may be on a separate chip or set of chips. In yet other alternative embodiments, part or all of RF transceiver circuitry 1622, baseband processing circuitry 1624, and application processing circuitry 1626 may be combined in the same chip or set of chips. In some embodiments, RF transceiver circuitry 1622 may be a part of interface 1614. RF transceiver circuitry 1622 may condition RF signals for processing circuitry 1620.

In certain embodiments, some or all of the functionality described herein as being performed by a WD may be provided by processing circuitry 1620 executing instructions stored on device readable medium 1630, which in certain embodiments may be a computer-readable storage medium. In alternative embodiments, some or all of the functionality may be provided by processing circuitry 1620 without executing instructions stored on a separate or discrete device readable storage medium, such as in a hard-wired manner. In any of those particular embodiments, whether executing instructions stored on a device readable storage medium or not, processing circuitry 1620 can be configured to perform the described functionality. The benefits provided by such functionality are not limited to processing circuitry 1620 alone or to other components of WD 1610, but are enjoyed by WD 1610 as a whole, and/or by end users and the wireless network generally.

Processing circuitry 1620 may be configured to perform any determining, calculating, or similar operations (e.g., certain obtaining operations) described herein as being performed by a WD. These operations, as performed by processing circuitry 1620, may include processing information obtained by processing circuitry 1620 by, for example, converting the obtained information into other information, comparing the obtained information or converted information to information stored by WD 1610, and/or performing one or more operations based on the obtained information or converted information, and as a result of said processing making a determination.

Device readable medium 1630 may be operable to store a computer program, software, an application including one or more of logic, rules, code, tables, etc. and/or other instructions capable of being executed by processing circuitry 1620. Device readable medium 1630 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1620. In some embodiments, processing circuitry 1620 and device readable medium 1630 may be considered to be integrated.

User interface equipment 1632 may provide components that allow for a human user to interact with WD 1610. Such interaction may be of many forms, such as visual, audial, tactile, etc. User interface equipment 1632 may be operable to produce output to the user and to allow the user to provide input to WD 1610. The type of interaction may vary depending on the type of user interface equipment 1632 installed in WD 1610. For example, if WD 1610 is a smart phone, the interaction may be via a touch screen; if WD 1610 is a smart meter, the interaction may be through a screen that provides usage (e.g., the number of gallons used) or a speaker that provides an audible alert (e.g., if smoke is detected). User interface equipment 1632 may include input interfaces, devices and circuits, and output interfaces, devices and circuits. User interface equipment 1632 is configured to allow input of information into WD 1610, and is connected to processing circuitry 1620 to allow processing circuitry 1620 to process the input information. User interface equipment 1632 may include, for example, a microphone, a proximity or other sensor, keys/buttons, a touch display, one or more cameras, a USB port, or other input circuitry. User interface equipment 1632 is also configured to allow output of information from WD 1610, and to allow processing circuitry 1620 to output information from WD 1610. User interface equipment 1632 may include, for example, a speaker, a display, vibrating circuitry, a USB port, a headphone interface, or other output circuitry. Using one or more input and output interfaces, devices, and circuits, of user interface equipment 1632, WD 1610 may communicate with end users and/or the wireless network, and allow them to benefit from the functionality described herein.

Auxiliary equipment 1634 is operable to provide more specific functionality which may not be generally performed by WDs. This may comprise specialized sensors for doing measurements for various purposes, interfaces for additional types of communication such as wired communications etc. The inclusion and type of components of auxiliary equipment 1634 may vary depending on the embodiment and/or scenario.

Power source 1636 may, in some embodiments, be in the form of a battery or battery pack. Other types of power sources, such as an external power source (e.g., an electricity outlet), photovoltaic devices or power cells, may also be used. WD 1610 may further comprise power circuitry 1637 for delivering power from power source 1636 to the various parts of WD 1610 which need power from power source 1636 to carry out any functionality described or indicated herein. Power circuitry 1637 may in certain embodiments comprise power management circuitry. Power circuitry 1637 may additionally or alternatively be operable to receive power from an external power source; in which case WD 1610 may be connectable to the external power source (such as an electricity outlet) via input circuitry or an interface such as an electrical power cable. Power circuitry 1637 may also in certain embodiments be operable to deliver power from an external power source to power source 1636. This may be, for example, for the charging of power source 1636. Power circuitry 1637 may perform any formatting, converting, or other modification to the power from power source 1636 to make the power suitable for the respective components of WD 1610 to which power is supplied.

Figure 17:
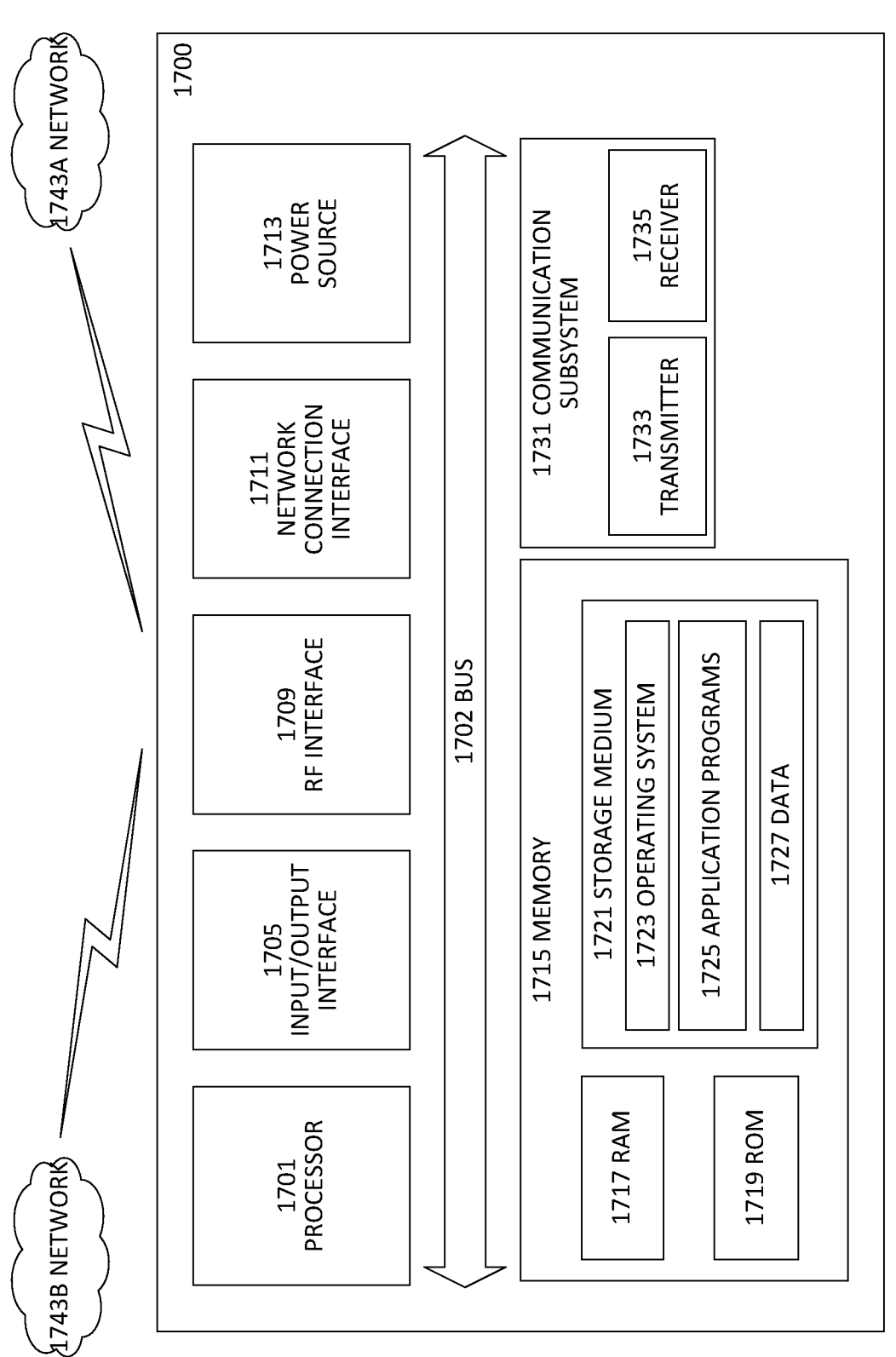
FIG. 17 is a block diagram of a user equipment according to some embodiments.

FIG. 17 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 17200 may be any UE identified by the 3$^{rd}$ Generation Partnership Project (3GPP), including a NB-IoT UE, a machine type communication (MTC) UE, and/or an enhanced MTC (eMTC) UE. UE 1700, as illustrated in FIG. 17, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 17 is a UE, the components discussed herein are equally applicable to a WD, and vice-versa.

In FIG. 17, UE 1700 includes processing circuitry 1701 that is operatively coupled to input/output interface 1705, radio frequency (RF) interface 1709, network connection interface 1711, memory 1715 including random access memory (RAM) 1717, read-only memory (ROM) 1719, and storage medium 1721 or the like, communication subsystem 1731, power source 1733, and/or any other component, or any combination thereof. Storage medium 1721 includes operating system 1723, application program 1725, and data 1727. In other embodiments, storage medium 1721 may include other similar types of information. Certain UEs may utilize all of the components shown in FIG. 17, or only a subset of the components. The level of integration between the components may vary from one UE to another UE. Further, certain UEs may contain multiple instances of a component, such as multiple processors, memories, transceivers, transmitters, receivers, etc.

In FIG. 17, processing circuitry 1701 may be configured to process computer instructions and data. Processing circuitry 1701 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1701 may include two central processing units (CPUs). Data may be information in a form suitable for use by a computer.

In the depicted embodiment, input/output interface 1705 may be configured to provide a communication interface to an input device, output device, or input and output device. UE 1700 may be configured to use an output device via input/output interface 1705. An output device may use the same type of interface port as an input device. For example, a USB port may be used to provide input to and output from UE 1700. The output device may be a speaker, a sound card, a video card, a display, a monitor, a printer, an actuator, an emitter, a smartcard, another output device, or any combination thereof. UE 1700 may be configured to use an input device via input/output interface 1705 to allow a user to capture information into UE 1700. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 17, RF interface 1709 may be configured to provide a communication interface to RF components such as a transmitter, a receiver, and an antenna. Network connection interface 1711 may be configured to provide a communication interface to network 1743*a*. Network 1743*a* may encompass wired and/or wireless networks such as a local-area network (LAN), a wide-area network (WAN), a computer network, a wireless network, a telecommunications network, another like network or any combination thereof. For example, network 1743*a* may comprise a Wi-Fi network. Network connection interface 1711 may be configured to include a receiver and a transmitter interface used to communicate with one or more other devices over a communication network according to one or more communication protocols, such as Ethernet, TCP/IP, SONET, ATM, or the like. Network connection interface 1711 may implement receiver and transmitter functionality appropriate to the communication network links (e.g., optical, electrical, and the like). The transmitter and receiver functions may share circuit components, software or firmware, or alternatively may be implemented separately.

RAM 1717 may be configured to interface via bus 1702 to processing circuitry 1701 to provide storage or caching of data or computer instructions during the execution of software programs such as the operating system, application programs, and device drivers. ROM 1719 may be configured to provide computer instructions or data to processing circuitry 1701. For example, ROM 1719 may be configured to store invariant low-level system code or data for basic system functions such as basic input and output (I/O), startup, or reception of keystrokes from a keyboard that are stored in a non-volatile memory. Storage medium 1721 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1721 may be configured to include operating system 1723, application program 1725 such as a web browser application, a widget or gadget engine or another application, and data file 1727. Storage medium 1721 may store, for use by UE 1700, any of a variety of various operating systems or combinations of operating systems.

Storage medium 1721 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1721 may allow UE 1700 to access computer-executable instructions, application programs or the like, stored on transitory or non-transitory memory media, to off-load data, or to upload data. An article of manufacture, such as one utilizing a communication system may be tangibly embodied in storage medium 1721, which may comprise a device readable medium.

In FIG. 17, processing circuitry 1701 may be configured to communicate with network 1743b using communication subsystem 1731. Network 1743a and network 1743b may be the same network or networks or different network or networks. Communication subsystem 1731 may be configured to include one or more transceivers used to communicate with network 1743b. For example, communication subsystem 1731 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1733 and/or receiver 1735 to implement transmitter or receiver functionality, respectively, appropriate to the RAN links (e.g., frequency allocations and the like). Further, transmitter 1733 and receiver 1735 of each transceiver may share circuit components, software or firmware, or alternatively may be implemented separately.

In the illustrated embodiment, the communication functions of communication subsystem 1731 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1731 may include cellular communication, Wi-Fi communication, Bluetooth communication, and GPS communication. Network 1743b may encompass wired and/or wireless networks such as a local-area network (LAN), a wide-area network (WAN), a computer network, a wireless network, a telecommunications network, another like network or any combination thereof. For example, network 1743b may be a cellular network, a Wi-Fi network, and/or a near-field network. Power source 1713 may be configured to provide alternating current (AC) or direct current (DC) power to components of UE 1700.

The features, benefits and/or functions described herein may be implemented in one of the components of UE 1700 or partitioned across multiple components of UE 1700. Further, the features, benefits, and/or functions described herein may be implemented in any combination of hardware, software or firmware. In one example, communication subsystem 1731 may be configured to include any of the components described herein. Further, processing circuitry 1701 may be configured to communicate with any of such components over bus 1702. In another example, any of such components may be represented by program instructions stored in memory that when executed by processing circuitry 1701 perform the corresponding functions described herein. In another example, the functionality of any of such components may be partitioned between processing circuitry 1701 and communication subsystem 1731. In another example, the non-computationally intensive functions of any of such components may be implemented in software or firmware and the computationally intensive functions may be implemented in hardware.

Figure 18:
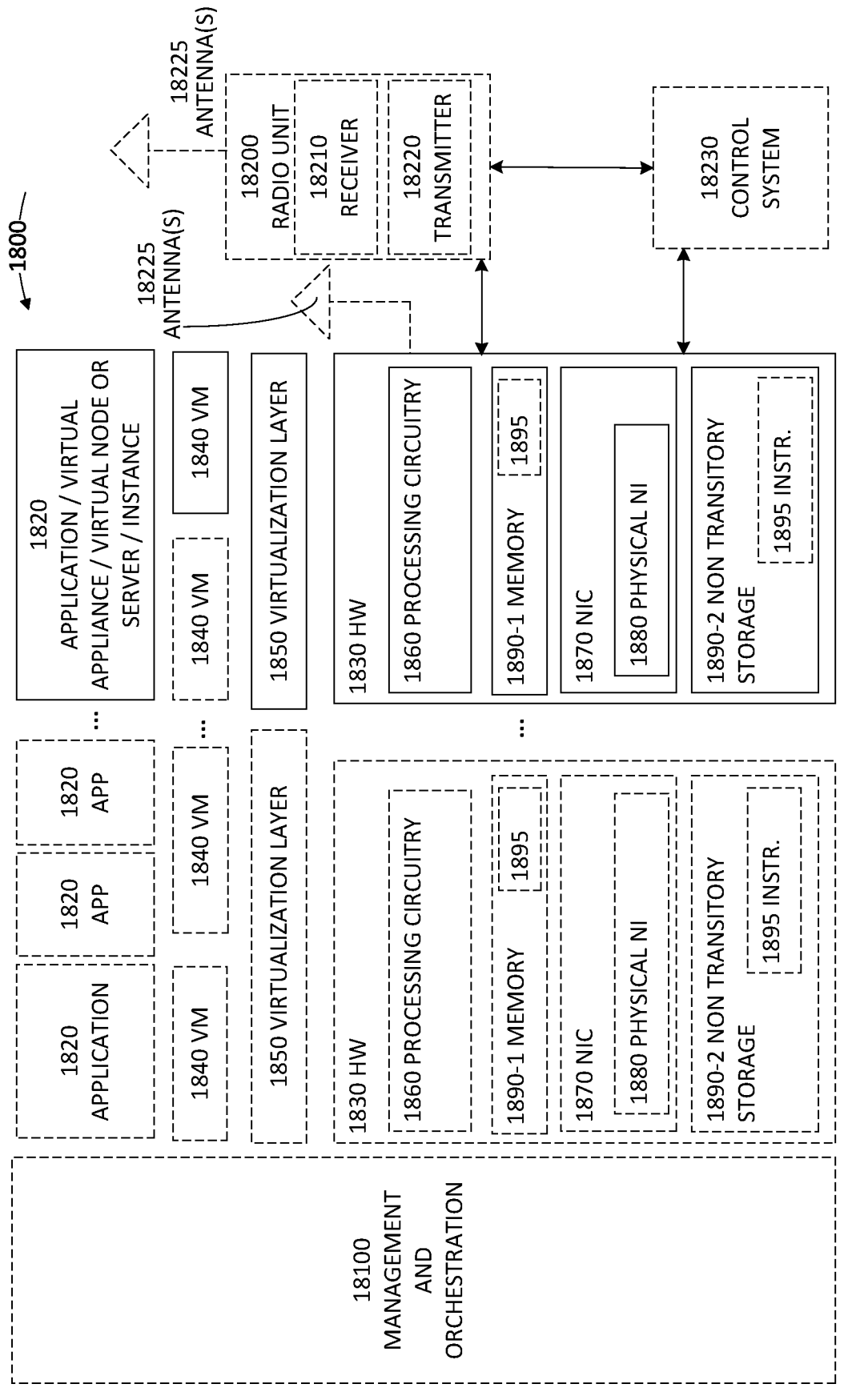
FIG. 18 is a block diagram of a virtualization environment according to some embodiments.

FIG. 18 is a schematic block diagram illustrating a virtualization environment 1800 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1800 hosted by one or more of hardware nodes 1830. Further, in embodiments in which the virtual node is not a radio access node or does not require radio connectivity (e.g., a core network node), then the network node may be entirely virtualized.

The functions may be implemented by one or more applications 1820 (which may alternatively be called software instances, virtual appliances, network functions, virtual nodes, virtual network functions, etc.) operative to implement some of the features, functions, and/or benefits of some of the embodiments disclosed herein. Applications 1820 are run in virtualization environment 1800 which provides hardware 1830 comprising processing circuitry 1860 and memory 1890. Memory 1890 contains instructions 1895 executable by processing circuitry 1860 whereby application 1820 is operative to provide one or more of the features, benefits, and/or functions disclosed herein.

Virtualization environment 1800, comprises general-purpose or special-purpose network hardware devices 1830 comprising a set of one or more processors or processing circuitry 1860, which may be commercial off-the-shelf (COTS) processors, dedicated Application Specific Integrated Circuits (ASICs), or any other type of processing circuitry including digital or analog hardware components or special purpose processors. Each hardware device may comprise memory 1890-1 which may be non-persistent memory for temporarily storing instructions 1895 or software executed by processing circuitry 1860. Each hardware device may comprise one or more network interface controllers (NICs) 1870, also known as network interface cards, which include physical network interface 1880. Each hardware device may also include non-transitory, persistent, machine-readable storage media 1890-2 having stored therein software 1895 and/or instructions executable by processing circuitry 1860. Software 1895 may include any type of software including software for instantiating one or more virtualization layers 1850 (also referred to as hypervisors), software to execute virtual machines 1840 as well as software allowing it to execute functions, features and/or benefits described in relation with some embodiments described herein.

Virtual machines 1840, comprise virtual processing, virtual memory, virtual networking or interface and virtual storage, and may be run by a corresponding virtualization layer 1850 or hypervisor. Different embodiments of the instance of virtual appliance 1820 may be implemented on one or more of virtual machines 1840, and the implementations may be made in different ways.

During operation, processing circuitry 1860 executes software 1895 to instantiate the hypervisor or virtualization layer 1850, which may sometimes be referred to as a virtual machine monitor (VMM). Virtualization layer 1850 may present a virtual operating platform that appears like networking hardware to virtual machine 1840.

As shown in FIG. 18, hardware 1830 may be a standalone network node with generic or specific components. Hardware 1830 may comprise antenna 18225 and may implement some functions via virtualization. Alternatively, hardware 1830 may be part of a larger cluster of hardware (e.g. such as in a data center or customer premise equipment (CPE)) where many hardware nodes work together and are managed via management and orchestration (MANO) 18100, which, among others, oversees lifecycle management of applications 1820.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1840 may be a software implementation of a physical machine that runs programs as if they were executing on a physical, non-virtualized machine. Each of virtual machines 1840, and that part of hardware 1830 that executes that virtual machine, be it hardware dedicated to that virtual machine and/or hardware shared by that virtual machine with others of the virtual machines 1840, forms a separate virtual network elements (VNE).

Still in the context of NFV, Virtual Network Function (VNF) is responsible for handling specific network functions that run in one or more virtual machines 1840 on top of hardware networking infrastructure 1830 and corresponds to application 1820 in FIG. 18.

In some embodiments, one or more radio units 18200 that each include one or more transmitters 18220 and one or more receivers 18210 may be coupled to one or more antennas 18225. Radio units 18200 may communicate directly with hardware nodes 1830 via one or more appropriate network interfaces and may be used in combination with the virtual components to provide a virtual node with radio capabilities, such as a radio access node or a base station.

In some embodiments, some signalling can be effected with the use of control system 18230 which may alternatively be used for communication between the hardware nodes 1830 and radio units 18200.

Figure 19:
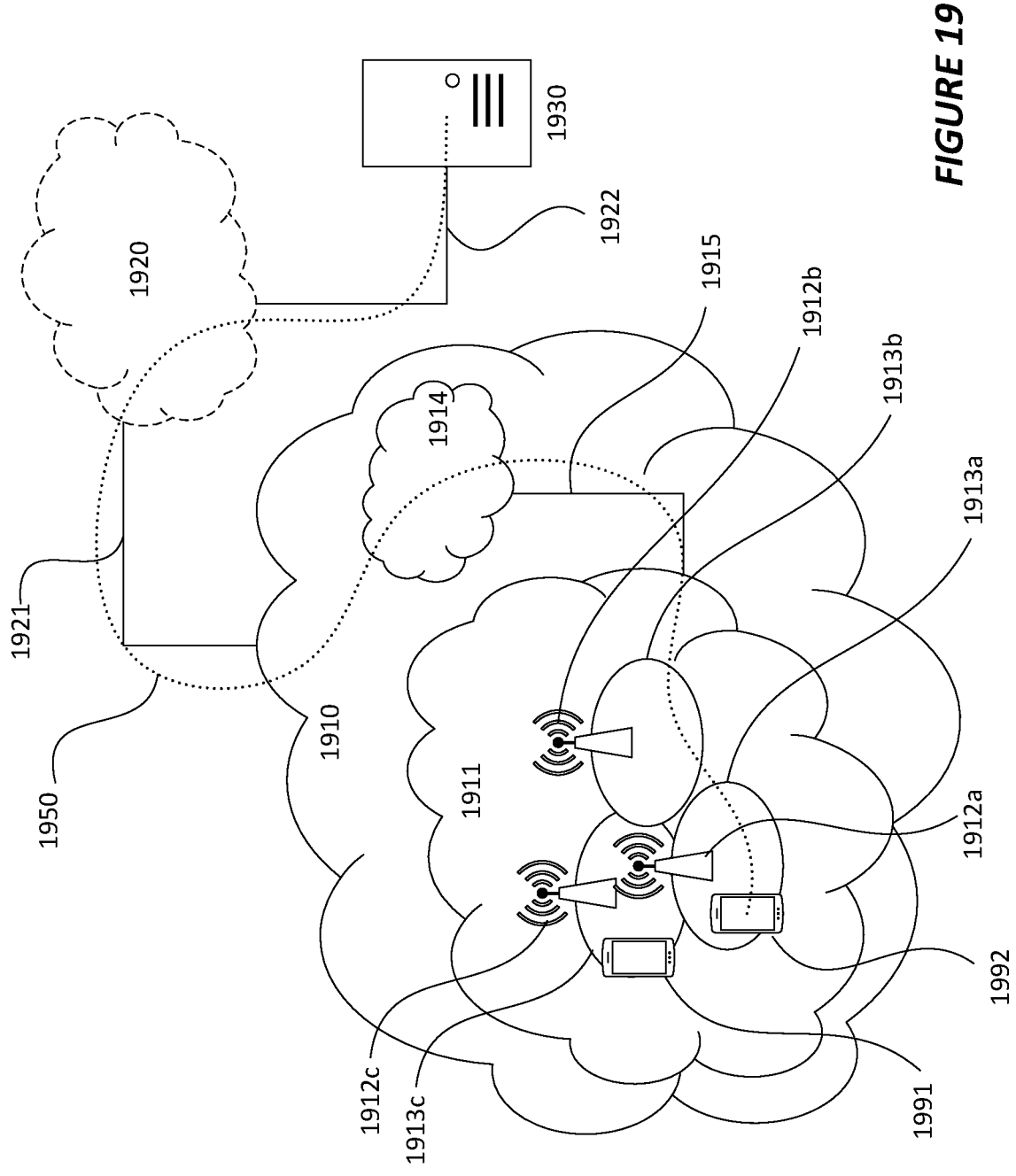
FIG. 19 is a block diagram of a communication network with a host computer according to some embodiments.

FIG. 19 illustrates a telecommunication network connected via an intermediate network to a host computer in accordance with some embodiments. In particular, with reference to FIG. 19, in accordance with an embodiment, a communication system includes telecommunication network 1910, such as a 3GPP-type cellular network, which comprises access network 1911, such as a radio access network, and core network 1914. Access network 1911 comprises a plurality of base stations 1912a, 1912b, 1912c, such as NBs, eNBs, gNBs or other types of wireless access points, each defining a corresponding coverage area 1913a, 1913b, 1913c. Each base station 1912a, 1912b, 1912c is connectable to core network 1914 over a wired or wireless connection 1915. A first UE 1991 located in coverage area 1913c is configured to wirelessly connect to, or be paged by, the corresponding base station 1912c. A second UE 1992 in coverage area 1913a is wirelessly connectable to the corresponding base station 1912a. While a plurality of UEs 1991, 1992 are illustrated in this example, the disclosed embodiments are equally applicable to a situation where a sole UE is in the coverage area or where a sole UE is connecting to the corresponding base station 1912.

Telecommunication network 1910 is itself connected to host computer 1930, which may be embodied in the hardware and/or software of a standalone server, a cloud-implemented server, a distributed server or as processing resources in a server farm. Host computer 1930 may be under the ownership or control of a service provider, or may be operated by the service provider or on behalf of the service provider. Connections 1921 and 1922 between telecommunication network 1910 and host computer 1930 may extend directly from core network 1914 to host computer 1930 or may go via an optional intermediate network 1920. Intermediate network 1920 may be one of, or a combination of more than one of, a public, private or hosted network; intermediate network 1920, if any, may be a backbone network or the Internet; in particular, intermediate network 1920 may comprise two or more sub-networks (not shown).

The communication system of FIG. 19 as a whole enables connectivity between the connected UEs 1991, 1992 and host computer 1930. The connectivity may be described as an over-the-top (OTT) connection 1950. Host computer 1930 and the connected UEs 1991, 1992 are configured to communicate data and/or signaling via OTT connection 1950, using access network 1911, core network 1914, any intermediate network 1920 and possible further infrastructure (not shown) as intermediaries. OTT connection 1950 may be transparent in the sense that the participating communication devices through which OTT connection 1950 passes are unaware of routing of uplink and downlink communications. For example, base station 1912 may not or need not be informed about the past routing of an incoming downlink communication with data originating from host computer 1930 to be forwarded (e.g., handed over) to a connected UE 1991. Similarly, base station 1912 need not be aware of the future routing of an outgoing uplink communication originating from the UE 1991 towards the host computer 1930.

Figure 20:
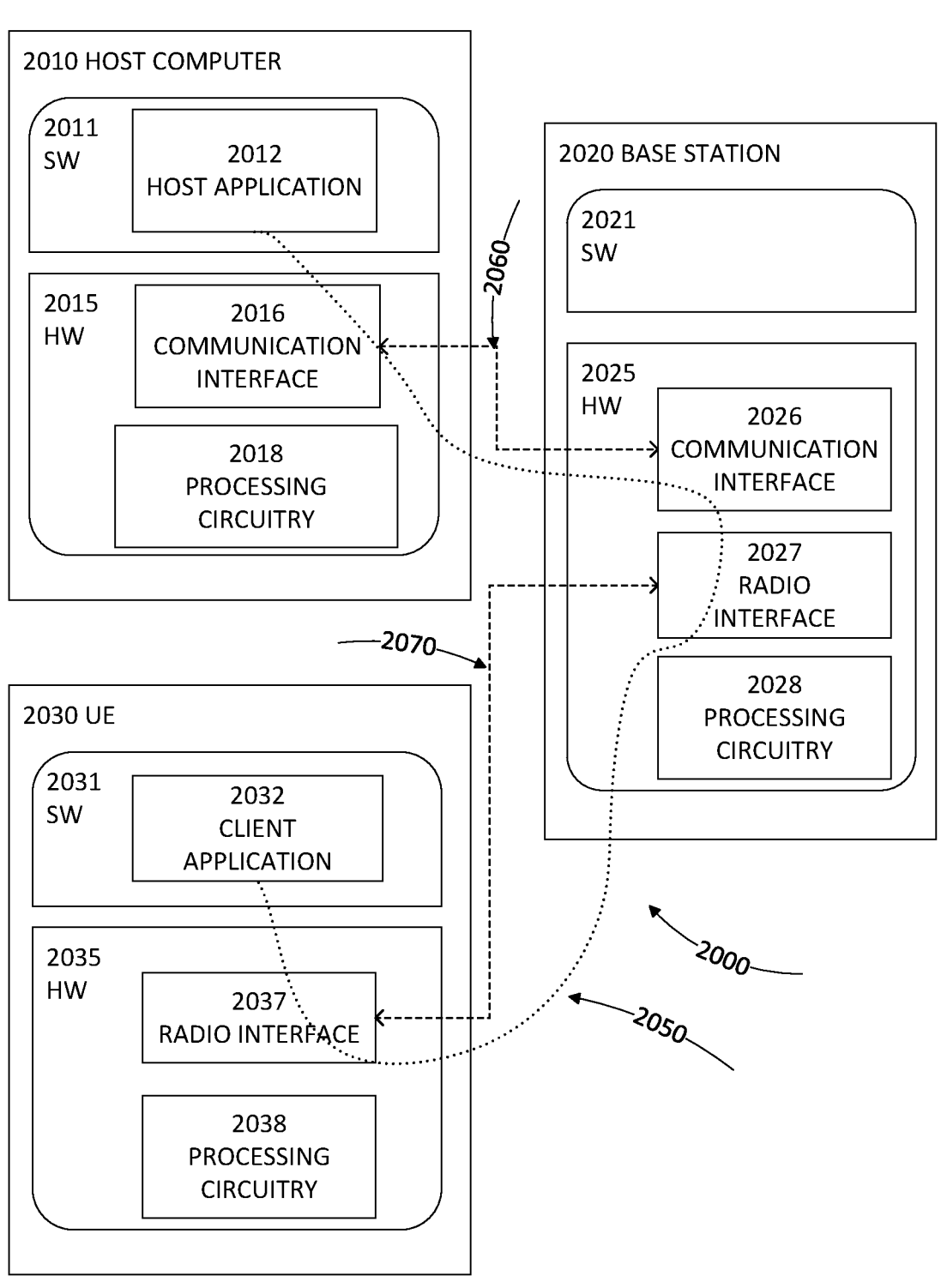
FIG. 20 is a block diagram of a host computer according to some embodiments.

Example implementations, in accordance with an embodiment, of the UE, base station and host computer discussed in the preceding paragraphs will now be described with reference to FIG. 20. FIG. 20 illustrates host computer communicating via a base station with a user equipment over a partially wireless connection in accordance with some embodiments In communication system 2000, host computer 2010 comprises hardware 2015 including communication interface 2016 configured to set up and maintain a wired or wireless connection with an interface of a different communication device of communication system 2000. Host computer 2010 further comprises processing circuitry 2018, which may have storage and/or processing capabilities. In particular, processing circuitry 2018 may comprise one or more programmable processors, application-specific integrated circuits, field programmable gate arrays or combinations of these (not shown) adapted to execute instructions. Host computer 2010 further comprises software 2011, which is stored in or accessible by host computer 2010 and executable by processing circuitry 2018. Software 2011 includes host application 2012. Host application 2012 may be operable to provide a service to a remote user, such as UE 2030 connecting via OTT connection 2050 terminating at UE 2030 and host computer 2010. In providing the service to the remote user, host application 2012 may provide user data which is transmitted using OTT connection 2050.

Communication system 2000 further includes base station 2020 provided in a telecommunication system and comprising hardware 2025 enabling it to communicate with host computer 2010 and with UE 2030. Hardware 2025 may include communication interface 2026 for setting up and maintaining a wired or wireless connection with an interface of a different communication device of communication system 2000, as well as radio interface 2027 for setting up and maintaining at least wireless connection 2070 with UE 2030 located in a coverage area (not shown in FIG. 20) served by base station 2020. Communication interface 2026 may be configured to facilitate connection 2060 to host computer 2010. Connection 2060 may be direct or it may pass through a core network (not shown in FIG. 20) of the telecommunication system and/or through one or more intermediate networks outside the telecommunication system. In the embodiment shown, hardware 2025 of base station 2020 further includes processing circuitry 2028, which may comprise one or more programmable processors, application-specific integrated circuits, field programmable gate arrays or combinations of these (not shown) adapted to execute instructions. Base station 2020 further has software 2021 stored internally or accessible via an external connection.

Communication system 2000 further includes UE 2030 already referred to. Its hardware 2035 may include radio interface 2037 configured to set up and maintain wireless connection 2070 with a base station serving a coverage area in which UE 2030 is currently located. Hardware 2035 of UE 2030 further includes processing circuitry 2038, which may comprise one or more programmable processors, application-specific integrated circuits, field programmable gate arrays or combinations of these (not shown) adapted to execute instructions. UE 2030 further comprises software 2031, which is stored in or accessible by UE 2030 and executable by processing circuitry 2038. Software 2031 includes client application 2032. Client application 2032 may be operable to provide a service to a human or non-human user via UE 2030, with the support of host computer 2010. In host computer 2010, an executing host application 2012 may communicate with the executing client application 2032 via OTT connection 2050 terminating at UE 2030 and host computer 2010. In providing the service to the user, client application 2032 may receive request data from host application 2012 and provide user data in response to the request data. OTT connection 2050 may transfer both the request data and the user data. Client application 2032 may interact with the user to generate the user data that it provides.

It is noted that host computer 2010, base station 2020 and UE 2030 illustrated in FIG. 20 may be similar or identical to host computer 1930, one of base stations 1912_a_, 1912_b_, 1912_c_ and one of UEs 1991, 1992 of FIG. 19, respectively. This is to say, the inner workings of these entities may be as shown in FIG. 20 and independently, the surrounding network topology may be that of FIG. 19.

In FIG. 20, OTT connection 2050 has been drawn abstractly to illustrate the communication between host computer 2010 and UE 2030 via base station 2020, without explicit reference to any intermediary devices and the precise routing of messages via these devices. Network infrastructure may determine the routing, which it may be configured to hide from UE 2030 or from the service provider operating host computer 2010, or both. While OTT connection 2050 is active, the network infrastructure may further take decisions by which it dynamically changes the routing (e.g., on the basis of load balancing consideration or reconfiguration of the network).

Wireless connection 2070 between UE 2030 and base station 2020 is in accordance with the teachings of the embodiments described throughout this disclosure. One or more of the various embodiments improve the performance of OTT services provided to UE 2030 using OTT connection 2050, in which wireless connection 2070 forms the last segment.

A measurement procedure may be provided for the purpose of monitoring data rate, latency and other factors on which the one or more embodiments improve. There may further be an optional network functionality for reconfiguring OTT connection 2050 between host computer 2010 and UE 2030, in response to variations in the measurement results. The measurement procedure and/or the network functionality for reconfiguring OTT connection 2050 may be implemented in software 2011 and hardware 2015 of host computer 2010 or in software 2031 and hardware 2035 of UE 2030, or both. In embodiments, sensors (not shown) may be deployed in or in association with communication devices through which OTT connection 2050 passes; the sensors may participate in the measurement procedure by supplying values of the monitored quantities exemplified above, or supplying values of other physical quantities from which software 2011, 2031 may compute or estimate the monitored quantities. The reconfiguring of OTT connection 2050 may include message format, retransmission settings, preferred routing etc.; the reconfiguring need not affect base station 2020, and it may be unknown or imperceptible to base station 2020. Such procedures and functionalities may be known and practiced in the art. In certain embodiments, measurements may involve proprietary UE signaling facilitating host computer 2010's measurements of throughput, propagation times, latency and the like. The measurements may be implemented in that software 2011 and 2031 causes messages to be transmitted, in particular empty or 'dummy' messages, using OTT connection 2050 while it monitors propagation times, errors etc.

Figure 21:
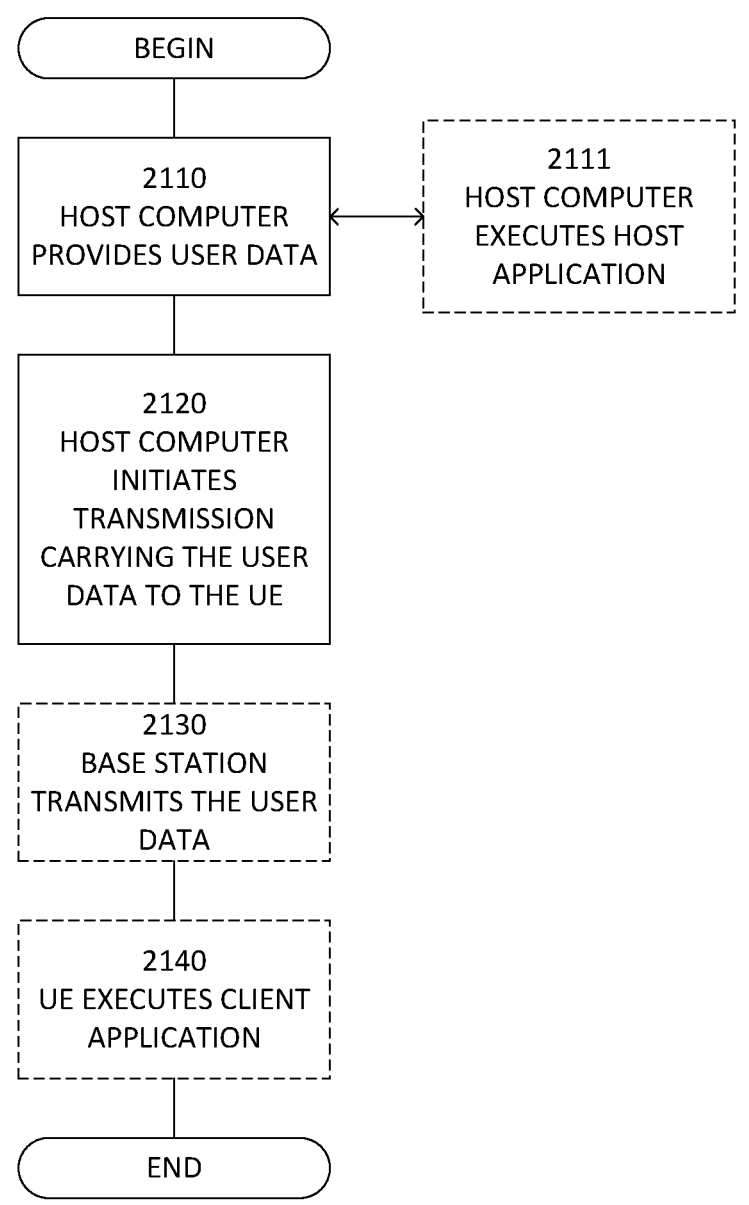
FIG. 21 is a flowchart illustrating a method implemented in a communication system, in accordance with one embodiment.

FIG. 21 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 21 will be included in this section. In step 2110, the host computer provides user data. In substep 2111 (which may be optional) of step 2110, the host computer provides the user data by executing a host application. In step 2120, the host computer initiates a transmission carrying the user data to the UE. In step 2130 (which may be optional), the base station transmits to the UE the user data which was carried in the transmission that the host computer initiated, in accordance with the teachings of the embodiments described throughout this disclosure. In step 2140 (which may also be optional), the UE executes a client application associated with the host application executed by the host computer.

Figure 22:
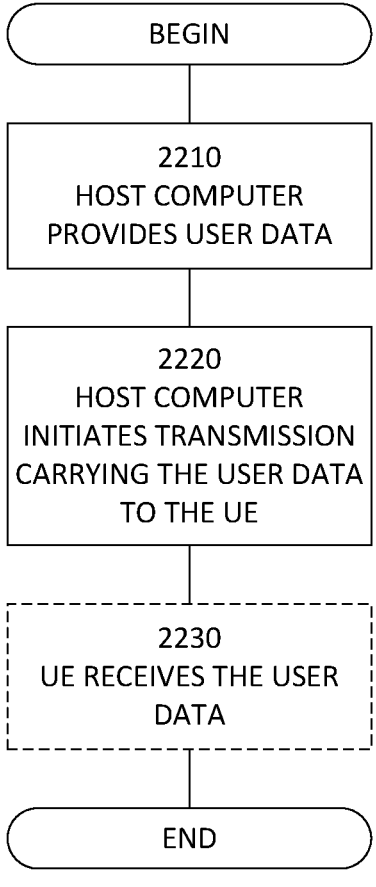
FIG. 22 is a flowchart illustrating a method implemented in a communication system, in accordance with one embodiment.

FIG. 22 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 22 will be included in this section. In step 2210 of the method, the host computer provides user data. In an optional substep (not shown) the host computer provides the user data by executing a host application. In step 2220, the host computer initiates a transmission carrying the user data to the UE. The transmission may pass via the base station, in accordance with the teachings of the embodiments described throughout this disclosure. In step 2230 (which may be optional), the UE receives the user data carried in the transmission.

Figure 23:
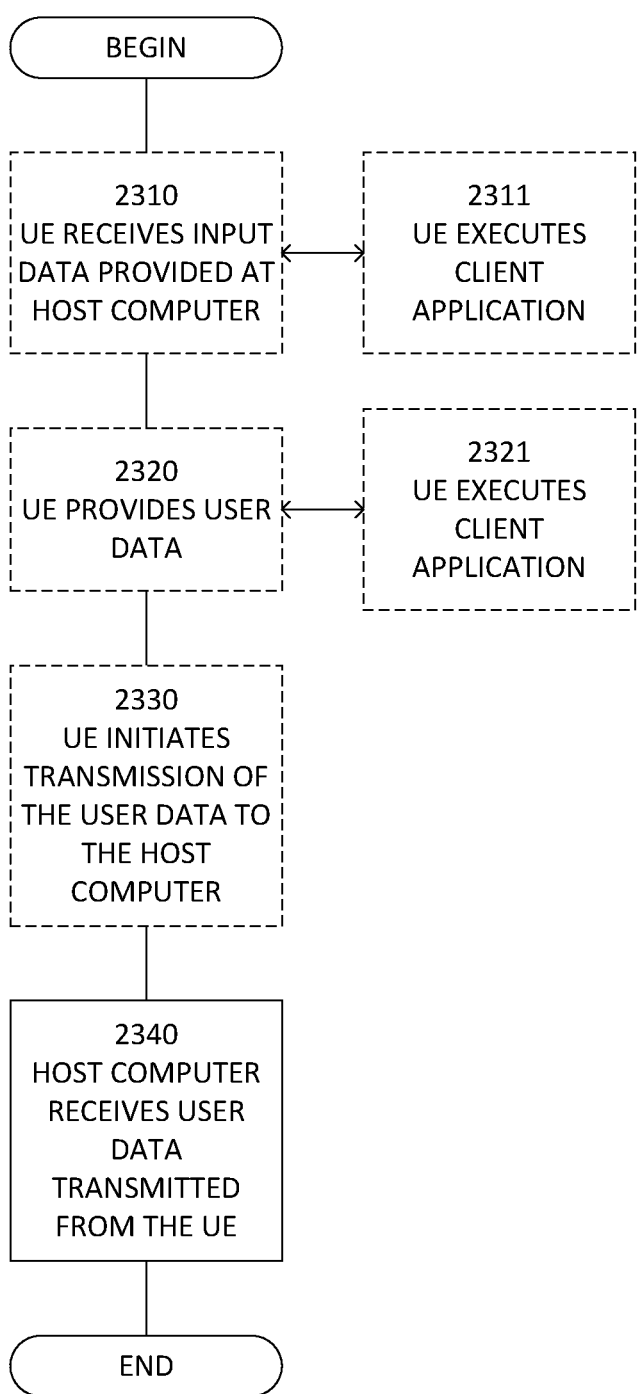
FIG. 23 is a flowchart illustrating a method implemented in a communication system, in accordance with one embodiment.

FIG. 23 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 23 will be included in this section. In step 2310 (which may be optional), the UE receives input data provided by the host computer. Additionally or alternatively, in step 2320, the UE provides user data. In substep 2321 (which may be optional) of step 2320, the UE provides the user data by executing a client application. In substep 2311 (which may be optional) of step 2310, the UE executes a client application which provides the user data in reaction to the received input data provided by the host computer. In providing the user data, the executed client application may further consider user input received from the user. Regardless of the specific manner in which the user data was provided, the UE initiates, in substep 2330 (which may be optional), transmission of the user data to the host computer. In step 2340 of the method, the host computer receives the user data transmitted from the UE, in accordance with the teachings of the embodiments described throughout this disclosure.

Figure 24:
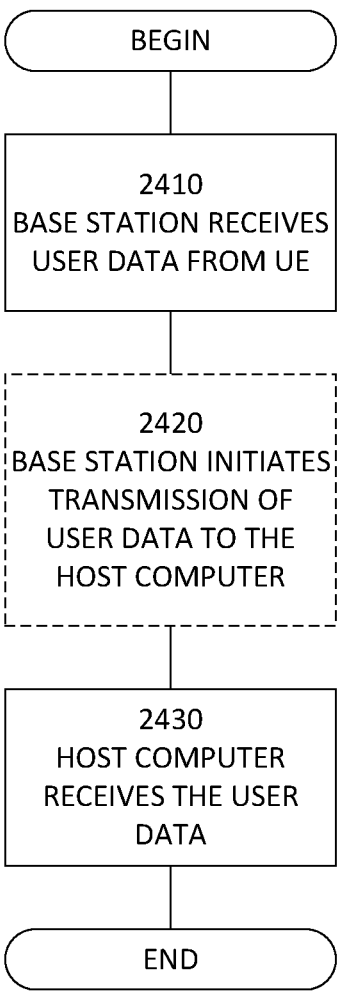
FIG. 24 is a flowchart illustrating a method implemented in a communication system, in accordance with one embodiment.

FIG. 24 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 24 will be included in this section. In step 2410 (which may be optional), in accordance with the teachings of the embodiments described throughout this disclosure, the base station receives user data from the UE. In step 2420 (which may be optional), the base station initiates transmission of the received user data to the host computer. In step 2430 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The term "A and/or B" as used herein covers embodiments having A alone, B alone, or both A and B together. The term "A and/or B" may therefore equivalently mean "at least one of any one or more of A and B".

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

Example embodiments of the techniques and apparatus described herein include, but are not limited to, the following enumerated examples:

Group A Embodiments

A1. A method performed by a wireless device, the method comprising:

transmitting, to a network node of a wireless communication network, a message that indicates a positioning capability of the wireless device.

A2. The method of embodiment A1, wherein the message is a message of a procedure for attaching the wireless device to or registering the wireless device with the wireless communication network.

A3. The method of any of embodiments A1-A2, wherein the message is an attach request message that requests attachment of the wireless device to the wireless communication network.

A4. The method of any of embodiments A1-A2, wherein the message is an area update request message that requests an update to registration of a tracking area of the wireless device or a registration area of the wireless device.

A5. The method of any of embodiments A1-A4, wherein the message is a request for one or more positioning ciphering keys.

A6. The method of any of embodiments A1-A5, wherein the network node is or implements an Access and Mobility Function, AMF.

A7. The method of embodiment A6, wherein the AMF is interconnected to multiple Location Management Functions, LMFs.

A8. The method of any of embodiments A1-A7, further comprising receiving positioning assistance information from another network node of the wireless communication network.

A9. The method of embodiment A8, wherein the another network node is or implements a Location Management Function, LMF.

A10. The method of any of embodiments A8-A9, wherein the positioning assistance information is received with, or contemporaneously with, a positioning request.

A11. The method of any of embodiments A1-A10, wherein the positioning capability indicates at least one of any one or more of:

one or more positioning methods supported by the wireless device; and capabilities of the wireless device to support an update of periodic assistance data;

a positioning reference signal processing capability of the wireless device; and a positioning reference signal resource capability of the wireless device.

A12. The method of any of embodiments A1-A11, wherein the positioning capability indicates at least one of any one or more of:

a radio access technology, RAT, dependent positioning capability; and a RAT-independent positioning capability.

A13. The method of any of embodiments A1-A12, wherein the message is a non-access stratum, NAS, message.

A14. The method of embodiment A13, wherein the message includes a positioning capability field that indicates the positioning capability of the wireless device.

A15. The method of any of embodiments A1-A14, wherein the positioning capability indicates a capability related to a positioning protocol supported between the wireless device and a positioning server in the wireless communication network.

A16. The method of any of embodiments A1-A15, wherein the message is transmitted to the network node responsive to receiving a NAS request for the positioning capability.

A17. The method of embodiment A16, wherein the NAS request is received responsive to transmitting a mobile originated location request to the network node.

A18. The method of any of embodiments A1 and A6-A15, wherein the message is a mobile originated location request included in an uplink NAS transport message.

A19. The method of embodiment A18, wherein the positioning capability is embedded in the message as a positioning protocol message.

AA. The method of any of the previous embodiments, further comprising:

providing user data; and forwarding the user data to a host computer via the transmission to a base station.

Group B Embodiments

B1. A method performed by a network node configured for use in a wireless communication network, the method comprising:

receiving, from a wireless device, a message indicating a positioning capability of the wireless device.

B2. The method of embodiment B1, wherein the message is a message of a procedure for attaching the wireless device to or registering the wireless device with the wireless communication network.

B3. The method of any of embodiments B1-B2, wherein the message is an attach request message that requests attachment of the wireless device to the wireless communication network.

B4. The method of any of embodiments B1-B2, wherein the message is an area update request message that requests an update to registration of a tracking area of the wireless device or a registration area of the wireless device.

B5. The method of any of embodiments B1-B2, wherein the message is a request for one or more positioning ciphering keys.

B6. The method of any of embodiments B1-B5, wherein the network node is or implements an Access and Mobility Function, AMF.

B7. The method of embodiment B6, wherein the AMF is interconnected to multiple Location Management Functions, LMFs.

B8. The method of any of embodiments B1-B7, further comprising storing the positioning capability of the wireless device in storage that is at or accessible to the network node.

B9. The method of embodiment B8, wherein the storage is storage of a Unified Data Management, UDM, accessible to the network node.

B10. The method of any of embodiments B1-B9, wherein the positioning capability indicates at least one of any one or more of:

one or more positioning methods supported by the wireless device; and capabilities of the wireless device to support an update of periodic assistance data;

a positioning reference signal processing capability of the wireless device; and a positioning reference signal resource capability of the wireless device.

B11. The method of any of embodiments B1-B10, wherein the positioning capability indicates at least one of any one or more of:

a radio access technology, RAT, dependent positioning capability; and a RAT-independent positioning capability.

B12. The method of any of embodiments B1-B11, wherein the message is a non-access stratum, NAS, message.

B13. The method of embodiment B12, wherein the message includes a positioning capability field that indicates the positioning capability of the wireless device.

B14. The method of any of embodiments B1-B13, further comprising receiving a positioning request for the wireless device, and sending the positioning request to another network node together with the positioning capability of the wireless device.

B15. The method of embodiment B14, further comprising storing the positioning capability of the wireless device in storage that is at or accessible to the network node, wherein the positioning request is received after storing the positioning capability of the wireless device in the storage, and wherein the method further comprises, responsive to receiving the positioning request, retrieving the positioning capability of the wireless device from the storage for sending to the another network node.

B16. The method of any of embodiments B14-B15, wherein the another network node is or implements a location management function, LMF.

B17. The method of any of embodiments B14-B15, wherein the positioning request and the positioning capability are sent within the same message.

B18. The method of any of embodiments B1-B17, wherein the message includes a positioning capability field that indicates the positioning capability of the wireless device.

B19. The method of any of embodiments B1-B18, wherein the positioning capability indicates a capability related to a positioning protocol supported between the wireless device and a positioning server in the wireless communication network.

B20. The method of any of embodiments B1-B19, further comprising transmitting, to the wireless device, a NAS request for the positioning capability, and wherein the positioning capability is received in response to the NAS request.

B21. The method of embodiment B20, wherein the NAS request is transmitted responsive to receiving a mobile originated location request from the wireless device.

B22. The method of any of embodiments B1 and B6-B21, wherein the message is a mobile originated location request included in an uplink NAS transport message.

B23. The method of embodiment B22, wherein the positioning capability is embedded in the message as a positioning protocol message.

B24. A method performed by a network node configured for use in a wireless communication network, the method comprising:
  sending, to another network node in the wireless communication network, a positioning request for a wireless device together with a positioning capability of the wireless device.

B25. The method of embodiment B24, further comprising storing the positioning capability of the wireless device in storage that is at or accessible to the network node, wherein the positioning request is received by the network node after storing the positioning capability of the wireless device in the storage, and wherein the method further comprises, responsive to receiving the positioning request, retrieving the positioning capability of the wireless device from the storage for sending to the another network node.

B26. The method of any of embodiments B24-B25, wherein the another network node is or implements a location management function, LMF.

B27. The method of any of embodiments B24-B26, wherein the positioning request and the positioning capability are sent within the same message.

B28. The method of any of embodiments B24-B27 wherein the network node is or implements an Access and Mobility Function, AMF.

B29. The method of any of embodiments B24-B28, wherein the positioning capability indicates at least one of any one or more of:
  one or more positioning methods supported by the wireless device; and
  capabilities of the wireless device to support an update of periodic assistance data;
  a positioning reference signal processing capability of the wireless device; and
  a positioning reference signal resource capability of the wireless device.

B30. The method of any of embodiments B24-B29, wherein the positioning capability indicates at least one of any one or more of: a radio access technology, RAT, dependent positioning capability; and a RAT-independent positioning capability.

B31. The method of any of embodiments B24-B30, wherein the positioning capability indicates a capability related to a positioning protocol supported between the wireless device and a positioning server in the wireless communication network.

BB. The method of any of the previous embodiments, further comprising:
  obtaining user data; and
  forwarding the user data to a host computer or a wireless device.

Group X Embodiments

X1. A method performed by a network node configured for use in a wireless communication network, the method comprising:
  receiving, from another network node, a positioning request for a wireless device together with a positioning capability of the wireless device.

X2. The method of embodiment X1, wherein the positioning request and the positioning capability are received within the same message.

X3. The method of any of embodiments X1-X2, wherein the another network node is or implements an Access and Mobility Function, AMF.

X4. The method of any of embodiments X1-X3, wherein the network node is or implements a location management function, LMF.

X5. The method of any of embodiments X1-X4, further comprising preparing positioning assistance information for the wireless device based on the positioning capability of the wireless device, and sending the positioning assistance information to the wireless device.

X6. The method of any of embodiments X1-X5, wherein the positioning capability indicates at least one of any one or more of:
  one or more positioning methods supported by the wireless device; and
  capabilities of the wireless device to support an update of periodic assistance data;
  a positioning reference signal processing capability of the wireless device; and
  a positioning reference signal resource capability of the wireless device.

X7. The method of any of embodiments X1-X6, wherein the positioning capability indicates at least one of any one or more of:

a radio access technology, RAT, dependent positioning capability; and a RAT-independent positioning capability.

X8. The method of any of embodiments X1-X7, wherein the positioning capability indicates a capability related to a positioning protocol supported between the wireless device and a positioning server in the wireless communication network.

Group C Embodiments

C1. A wireless device configured to perform any of the steps of any of the Group A embodiments.

C2. A wireless device comprising processing circuitry configured to perform any of the steps of any of the Group A embodiments.

C3. A wireless device comprising:

communication circuitry; and processing circuitry configured to perform any of the steps of any of the Group A embodiments.

C4. A wireless device comprising:

processing circuitry configured to perform any of the steps of any of the Group A embodiments; and power supply circuitry configured to supply power to the wireless device.

C5. A wireless device comprising:

processing circuitry and memory, the memory containing instructions executable by the processing circuitry whereby the wireless device is con-figured to perform any of the steps of any of the Group A embodiments.

C6. A user equipment (UE) comprising:

an antenna configured to send and receive wireless sig-nals;

radio front-end circuitry connected to the antenna and to processing circuitry, and configured to condition sig-nals communicated between the antenna and the pro-cessing circuitry;

the processing circuitry being configured to perform any of the steps of any of the Group A embodiments;

an input interface connected to the processing circuitry and configured to allow input of information into the UE to be processed by the processing circuitry;

an output interface connected to the processing circuitry and configured to output information from the UE that has been processed by the processing circuitry; and a battery connected to the processing circuitry and con-figured to supply power to the UE.

C7. A computer program comprising instructions which, when executed by at least one processor of a wireless device, causes the wireless device to carry out the steps of any of the Group A embodiments.

C8. A carrier containing the computer program of embodiment C7, wherein the carrier is one of an electronic signal, optical signal, radio signal, or computer readable storage medium.

C9. A network node configured to perform any of the steps of any of the Group B or Group X embodiments.

C10. A network node comprising processing circuitry configured to perform any of the steps of any of the Group B or Group X embodiments.

C11. A network node comprising:

communication circuitry; and processing circuitry configured to perform any of the steps of any of the Group B or Group X embodiments.

C12. A network node comprising:

processing circuitry configured to perform any of the steps of any of the Group B or Group X embodiments;

power supply circuitry configured to supply power to the network node.

C13. A network node comprising:

processing circuitry and memory, the memory containing instructions executable by the processing circuitry whereby the network node is configured to perform any of the steps of any of the Group B or Group X embodiments.

C14. The network node of any of embodiments C9-C13, wherein the network node is or implements an AMF.

C15. A computer program comprising instructions which, when executed by at least one processor of a network node, causes the network node to carry out the steps of any of the Group B or Group X embodiments.

C16. The computer program of embodiment C14, wherein the network node is or implements an AMF.

C17. A carrier containing the computer program of any of embodiments C15-C16, wherein the carrier is one of an electronic signal, optical signal, radio signal, or computer readable storage medium.

Group D Embodiments

D1. A communication system including a host computer comprising:

processing circuitry configured to provide user data; and a communication interface configured to forward the user data to a cellular network for transmission to a user equipment (UE), wherein the cellular network comprises a base station having a radio interface and processing circuitry, the base station's processing circuitry configured to per-form any of the steps of any of the Group B embodi-ments.

D2. The communication system of the previous embodi-ment further including the base station.

D3. The communication system of the previous 2 embodi-ments, further including the UE, wherein the UE is config-ured to communicate with the base station.

D4. The communication system of the previous 3 embodi-ments, wherein:

the processing circuitry of the host computer is configured to execute a host application, thereby providing the user data; and the UE comprises processing circuitry configured to execute a client application associated with the host application.

D5. A method implemented in a communication system including a host computer, a base station and a user equip-ment (UE), the method comprising:

at the host computer, providing user data; and at the host computer, initiating a transmission carrying the user data to the UE via a cellular network comprising the base station, wherein the base station performs any of the steps of any of the Group B embodiments.

D6. The method of the previous embodiment, further comprising, at the base station, transmitting the user data.

D7. The method of the previous 2 embodiments, wherein the user data is provided at the host computer by executing a host application, the method further comprising, at the UE, executing a client application associated with the host appli-cation.

D8. A user equipment (UE) configured to communicate with a base station, the UE comprising a radio interface and processing circuitry configured to perform any of the previous 3 embodiments.

D9. A communication system including a host computer comprising:

processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

D10. The communication system of the previous embodiment, wherein the cellular network further includes a base station configured to communicate with the UE.

D11. The communication system of the previous 2 embodiments, wherein:

the processing circuitry of the host computer is configured to execute a host application, thereby providing the user data; and the UE's processing circuitry is configured to execute a client application associated with the host application.

D12. A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs any of the steps of any of the Group A embodiments.

D13. The method of the previous embodiment, further comprising at the UE, receiving the user data from the base station.

D14. A communication system including a host computer comprising:

communication interface configured to receive user data originating from a transmission from a user equipment (UE) to a base station, wherein the UE comprises a radio interface and processing circuitry, the UE's processing circuitry configured to perform any of the steps of any of the Group A embodiments.

D15. The communication system of the previous embodiment, further including the UE.

D16. The communication system of the previous 2 embodiments, further including the base station, wherein the base station comprises a radio interface configured to communicate with the UE and a communication interface configured to forward to the host computer the user data carried by a transmission from the UE to the base station.

D17. The communication system of the previous 3 embodiments, wherein:

the processing circuitry of the host computer is configured to execute a host application; and the UE's processing circuitry is configured to execute a client application associated with the host application, thereby providing the user data.

D18. The communication system of the previous 4 embodiments, wherein:

the processing circuitry of the host computer is configured to execute a host application, thereby providing request data; and the UE's processing circuitry is configured to execute a client application associated with the host application, thereby providing the user data in response to the request data.

D19. A method implemented in a communication system including a host computer, a base station and a user equipment (UE), the method comprising:

at the host computer, receiving user data transmitted to the base station from the UE, wherein the UE performs any of the steps of any of the Group A embodiments.

D20. The method of the previous embodiment, further comprising, at the UE, providing the user data to the base station.

D21. The method of the previous 2 embodiments, further comprising:

at the UE, executing a client application, thereby providing the user data to be transmitted; and at the host computer, executing a host application associated with the client application.

D22. The method of the previous 3 embodiments, further comprising:

at the UE, executing a client application; and at the UE, receiving input data to the client application, the input data being provided at the host computer by executing a host application associated with the client application, wherein the user data to be transmitted is provided by the client application in response to the input data.

D23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

D24. The communication system of the previous embodiment further including the base station.

D25. The communication system of the previous 2 embodiments, further including the UE, wherein the UE is configured to communicate with the base station.

D26. The communication system of the previous 3 embodiments, wherein:

the processing circuitry of the host computer is configured to execute a host application;

the UE is configured to execute a client application associated with the host application, thereby providing the user data to be received by the host computer.

D27. A method implemented in a communication system including a host computer, a base station and a user equipment (UE), the method comprising:

at the host computer, receiving, from the base station, user data originating from a transmission which the base station has received from the UE, wherein the UE performs any of the steps of any of the Group A embodiments.

D28. The method of the previous embodiment, further comprising at the base station, receiving the user data from the UE.

D29. The method of the previous 2 embodiments, further comprising at the base station, initiating a transmission of the received user data to the host computer.

What is claimed is:

1. A method performed by a network node configured for use in a wireless communication network, the method comprising:

receiving one or more positioning capabilities of a wireless device;

storing the one or more positioning capabilities in storage that is at or accessible to the network node;

after storing the one or more positioning capabilities of the wireless device, receiving a positioning request for the wireless device;

responsive to receiving the positioning request, retrieving the one or more positioning capabilities of the wireless device from the storage; and sending, to a positioning server in the wireless communication network, a message that comprises the positioning request and that includes the one or more positioning capabilities retrieved from the storage.

2. The method of claim 1, wherein receiving the one or more positioning capabilities comprises fetching the one or more positioning capabilities from the positioning server.

3. The method of claim 1, wherein the one or more positioning capabilities indicate at least one of any one or more of:

one or more positioning methods supported by the wireless device; and capabilities of the wireless device to support an update of periodic assistance data; and a positioning reference signal processing capability of the wireless device; and a positioning reference signal resource capability of the wireless device; and a capability related to a positioning protocol supported between the wireless device and a positioning server in the wireless communication network.

4. The method of claim 1, wherein the positioning server implements a location management function (LMF).

5. The method of claim 1, wherein the network node is or implements an Access and Mobility Function (AMF).

6. The method of claim 1, wherein each of the one or more positioning capabilities is categorized by the message as either:

a radio access technology (RAT) dependent positioning capability; or a RAT-independent positioning capability.

7. The method of claim 1, wherein receiving one or more positioning capabilities of a wireless device comprises receiving the one or more positioning capabilities of the wireless device in a message of a procedure for attaching the wireless device to or registering the wireless device with the wireless communication network.

8. The method of claim 1, wherein the one or more positioning capabilities indicate at least one of any one or more of:

one or more positioning methods supported by the wireless device; and capabilities of the wireless device to support an update of periodic assistance data.

9. The method of claim 1, wherein the storage is or is provided by a Unified Data Management (UDM) node.

10. A network node configured for use in a wireless communication network, the network node comprising:

communication circuitry; and processing circuitry configured to:

receive one or more positioning capabilities of a wireless device;

store the one or more positioning capabilities in storage that is at or accessible to the network node;

after storing the one or more positioning capabilities of the wireless device, receive a positioning request for the wireless device;

responsive to receiving the positioning request, retrieve the one or more positioning capabilities of the wireless device from the storage; and send, to a positioning server in the wireless communication network, a message that comprises the positioning request and that includes the one or more positioning capabilities retrieved from the storage.

11. The network node of claim 10, the processing circuitry configured to receive the one or more positioning capabilities by fetching the one or more positioning capabilities from the positioning server.

12. The network node of claim 10, wherein the one or more positioning capabilities indicate at least one of any one or more of:

one or more positioning methods supported by the wireless device; and capabilities of the wireless device to support an update of periodic assistance data; and a positioning reference signal processing capability of the wireless device; and a positioning reference signal resource capability of the wireless device; and a capability related to a positioning protocol supported between the wireless device and a positioning server in the wireless communication network.

13. The network node of claim 10, wherein the positioning server implements a location management function (LMF).

14. The network node of claim 10, wherein the network node is or implements an Access and Mobility Function (AMF).

15. The network node of claim 10, wherein each of the one or more positioning capabilities is categorized by the message as either:

a radio access technology (RAT) dependent positioning capability; or a RAT-independent positioning capability.

16. The network node of claim 10, wherein the processing circuitry is configured to receive the one or more positioning capabilities of the wireless device in a message of a procedure for attaching the wireless device to or registering the wireless device with the wireless communication network.

17. The network node of claim 10, wherein the one or more positioning capabilities indicate at least one of any one or more of:

one or more positioning methods supported by the wireless device; and capabilities of the wireless device to support an update of periodic assistance data.

18. The network node of claim 10, wherein the storage is or is provided by a Unified Data Management (UDM) node.

* * * * *